United States Patent
Ohta

(10) Patent No.: US 6,917,434 B1
(45) Date of Patent: Jul. 12, 2005

(54) INFORMATION PROCESSING APPARATUS, DATA PROCESSING METHOD, PRINT DRIVER PROGRAM FORMING METHOD, INFORMATION PROCESSING SYSTEM, AND MEMORY MEDIUM

(75) Inventor: Munehiko Ohta, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/314,926

(22) Filed: May 20, 1999

(30) Foreign Application Priority Data

| May 21, 1998 | (JP) | ............................................ 10-155396 |
| Jul. 24, 1998 | (JP) | ............................................ 10-209950 |
| Mar. 19, 1999 | (JP) | ............................................ 11-075465 |

(51) Int. Cl.$^7$ ............................................. G06F 15/00
(52) U.S. Cl. ...................................... 358/1.13; 358/1.9
(58) Field of Search ........................... 358/1.1, 1.5, 1.9, 358/1.11, 1.12, 1.13, 1.14, 1.15, 1.16

(56) References Cited

U.S. PATENT DOCUMENTS

| 4,313,124 A | 1/1982 | Hara ....................... 346/140 R |
| 4,345,262 A | 8/1982 | Shirato et al. ........... 346/140 R |
| 4,459,600 A | 7/1984 | Sato et al. ............... 346/140 R |
| 4,463,359 A | 7/1984 | Ayata et al. ................... 346/1.1 |
| 4,558,333 A | 12/1985 | Sugitani et al. ......... 346/140 R |
| 4,723,129 A | 2/1988 | Endo et al. .................... 346/1.1 |
| 4,740,796 A | 4/1988 | Endo et al. .................... 346/1.1 |
| 5,228,118 A | * 7/1993 | Sasaki ....................... 358/1.13 |
| 5,729,625 A | * 3/1998 | Miyake ....................... 382/169 |
| 5,907,666 A | * 5/1999 | Yano et al. .................... 358/1.9 |
| 6,139,134 A | * 10/2000 | Ando et al. .................... 347/84 |

FOREIGN PATENT DOCUMENTS

| EP | 0 575 172 A1 | 12/1993 |
| EP | 0 772 115 A1 | 5/1997 |
| EP | 0 787 596 A1 | 8/1997 |
| EP | 0 802 060 A2 | 10/1997 |
| JP | 54-056847 | 5/1979 |
| JP | 59-123670 | 7/1984 |
| JP | 59-138461 | 8/1984 |
| JP | 60-071260 | 4/1985 |
| JP | 08-142349 | 6/1996 |
| JP | 08-150735 | 6/1996 |

* cited by examiner

*Primary Examiner*—Mark Wallerson
(74) *Attorney, Agent, or Firm*—Fitzpatrick, Cella, Harper & Scinto

(57) ABSTRACT

It is a subject to provide an information processing apparatus which makes it easy to form program parts depending on individual installation of image output apparatuses and which can suppress an increase in code amount of driver software. The apparatus has program modules for processing quantized image information in accordance with characteristics of an image output apparatus by different methods and virtual switches provided in a program. The modules having the unified interface are switched by the virtual switches in accordance with either a mode of using which image output apparatus as a target and a mode of using which function of the image output apparatus when the image is formed. The formed data is handed to the image output apparatus through a spooler prepare for the OS.

49 Claims, 21 Drawing Sheets

EXAMPLE OF COLOR ARRANGEMENT ON SHEET

INFORMATION PROCESSING APPARATUS, DATA PROCESSING METHOD, PRINT DRIVER PROGRAM FORMING METHOD, INFORMATION PROCESSING SYSTEM, AND MEMORY MEDIUM

BACKGROUND OF THE INVENTION

1. Field of the Invention

The invention relates to an information processing apparatus, a data processing method, and an information processing system for outputting image information to an image output apparatus such as an ink jet printer to receive the image information. The invention also relates to a computer readable memory medium to realize the data processing method.

2. Related Background Art

Generally, in a conventional driver software which is applied to an image output apparatus for receiving line-divided image information, fundamentally it is a general way that the line-divided information according to a common data format except for a resolution/print color, and the like of the image output apparatus is received and subsequent data processes which are necessary in association with the installation peculiar to an individual output apparatus are executed in each of the output apparatuses.

In recent years, however, since the image output apparatuses are widely used, it is demanded to provide those apparatuses by lower costs. On the other hand, an information processing ability of a host apparatus to which the image output apparatuses are connected is rapidly increasing. In consideration of such circumstances, there has been tried a method whereby a part of the processes performed in the image output apparatus are shifted to driver software for the image output apparatus which operates in the host apparatus, thereby reducing a hardware amount in the image output apparatus and suppressing the costs of the apparatus.

For example, as such driver software, there is driver software for generating an emission pattern of a waterproof reinforcement agent which is emitted in accordance with each pixel forming an image, driver software for shifting a phase of line-divided image information in accordance with a deviation of a physical position of each color print head to form the image and sending the resultant image information, or the like.

As such an image output apparatus is widespread and is often used in a daily life, as sizes of the papers which are used for recording, as well as the conventional office-use regular size papers of the A4 size and B5 size, longitudinal papers of irregular sizes of shapes like a hanging screen and a transversal screen are often used.

As such an image output apparatus, an image output apparatus for recording in the lateral direction such that recording colors are arranged in the raster direction in parallel is initially a general apparatus. However, a head arrangement in which recording means of the respective colors are arranged in the subscanning direction (vertical arrangement) is often used because of advantages such that the apparatus can be designed in a compact size in the raster direction, a blur of an image in a color band boundary portion, and a color deviation depending on the scanning direction of the recording image are small, there is a superiority in terms of the costs of the sole body of the print recording head, and the like.

In the conventional image output apparatus with the lateral arrangement head construction, usually, there is used a method known as a "line-sequential format" whereby image information of each color is transferred in the main scanning direction (hereinafter, referred to as a "raster direction") of the recording head every raster or on a unit basis of a line in which a plurality of rasters are combined, namely, a method whereby image data of Y, M, C, and Bk of the same raster or line is transmitted or received, and after that, the image data of Y, M, C, and Bk of the next raster or line is transmitted and received.

Specifically speaking, the above method is realized by a combination of a raster image data transmission command, a raster (subscanning direction) position shift command, inter-page raster number setting command, a new page command, and the like.

On the other hand, in the conventional image output apparatus with the vertical arrangement head construction, in the case where transmission of color data when performing a color recording was executed by using the "line-sequential system", with respect to a memory area of a bit map in which image data has been developed (hereinafter, such a memory area is called a "print buffer"), an area that is remarkably larger than that in case of the lateral arrangement head is necessary.

An example of trying to solve such a problem is a method whereby a timing of image information which is transmitted to the image output apparatus is previously shifted by only a position offset for a reference color of the recording head and the image information is transmitted as shown in JP-A-08-142349 or JP-A-08-150735.

That is, if image information of an image as shown in FIG. 17 is transmitted by using a recording head having a structure as shown in FIG. 16, a head raster of Y is used as a reference, a position offset of 32 rasters is added to the image information of M, a position offset of 64 rasters is added to the image information of C, a position offset of 96 rasters is added to the image information of Bk as shown in FIG. 18, and the resultant image information is transmitted.

That is, it is a method whereby the image data of the first raster of M is transmitted subsequently to the image data of the 33rd raster of Y and the image data of the 65th raster of M, the image data of the 33rd raster of C, and the image data of the first raster of Bk are transmitted subsequently to the image data of the 97th raster of Y, (hereinafter, such a transmitting method of the image information is called an "offset transmission").

By using such an offset transmission, a memory area of a bit map in which image data has been developed in the image output apparatus can be remarkably reduced. Even in this case, so long as the paper size of a recording medium is a single sheet, by combining the raster image data transmission command, raster (subscanning direction) position shift command, inter-page raster number designation command, and new page command, the recording apparatus can be controlled by a command system similar to the method of simultaneously transmitting the image information of the respective colors constructing the same raster.

Hitherto, in case of printing out by using OA equipment, it is performed via application software installed therein. For example, in case of recording to longitudinal papers of an irregular size, there are mainly a method whereby a program to record by using the longitudinal papers of an irregular size is set into the application software and the recording is performed and a method whereby a program to record by using regular size papers of the A4 size, B5 size, and the like which are ordinarily used is set into the application software.

In printer driver software installed in the host apparatus such as personal computer or word processor, the longitudinal papers are processed by regarding such that the regular size papers are continuous in the subscanning direction without a gap, thereby recording.

In case of using the former method, the application software which can record to the longitudinal papers is limited to software which has previously been designed on the assumption that the recording is performed to the longitudinal papers as a prerequisite. With respect to this point, according to the latter method, so long as the application software can record to the regular size papers, there is an advantage such that the recording to the longitudinal papers can be performed with respect to all of the software.

Therefore, hitherto, the recording to the longitudinal papers has usually been performed by using the latter method.

In recent years, even for an output matter of an image output apparatus such as an ink jet printer or the like, at the time of the printing of addresses of the mails or the printing of a hanging screen which is presented in the outdoors, it is demanded to improve the waterproof so as not to cause a situation such that the printed contents are blurred due to the adhesion of the water by raindrops or the like and they cannot be read or a situation such that even if the printed contents can be read, the printed surface is remarkably polluted. As one of the measures for solving the above problems, there has been realized a print system in which the waterproof is realized by a method whereby a waterproof reinforcement agent to reinforce the waterproof by reacting with the ink is simultaneously emitted to a printing position upon printing.

In such a print system, generally, with reference to data to emit ink of (Bk, C, M, and Y) or the like which are used for printing, data for the waterproof reinforcement agent of patterns corresponding to them is formed and the formed data is printed by using a printing mechanism similar to the print data of each color.

As for a method of forming an emission pattern of the waterproof reinforcement agent, for example, there is considered a method whereby the OR of the print data of the respective colors which are printed to the same position is calculated and is used as print data for the waterproof reinforcement agent, thereby guaranteeing that a dot of the waterproof reinforcement agent is also certainly printed at a position where a dot forming an image is printed, or the like.

The process to decide the emission pattern of the waterproof reinforcement agent has conventionally been executed by using the software/hardware in the conventional printer. This method has advantages such that as a format of image data that is received by the printer, it is sufficient to transmit the same image data without being aware of the presence or absence of the waterproof reinforcement agent, namely, with respect to at least the image data portion regarding the printing, the common image data can be used without being aware of the presence or absence of the waterproof reinforcement agent in the host apparatus.

However, in the case where a part of the processes which are performed in the image output apparatus as mentioned above are shifted to the driver software for the image output apparatus, for example, when the processing contents are individually realized as subroutines in the driver, not only a program interface has to be merely designed but also an amount of codes of the driver software which is loaded onto a memory increases.

Further, since those routines depend on the individual hardware of the image output apparatus, general readable performance for the program designer which is not familiar to the installation of the individual image output apparatus is lost and it also becomes a large obstacle on maintenance and management of the software.

In case of using the method whereby the longitudinal papers are processed by regarding such that the regular size papers are continuous in the subscanning direction without a gap in the printer driver software installed in the host apparatus by using the conventional "offset transmission" system, thereby recording, a problem occurs in a processing method of the new page command in a connecting portion between the pages before and after the present page.

For example, in the case where image information of an image in which a plurality of pages are continuous in the subscanning direction as shown in FIG. 17 is transmitted without a gap, the image data should be transmitted in a form such that a blank area occurring by the new page command also has an offset every color as shown in FIG. 18.

However, since the reference position differs every color, for example, even if Y is used as a reference color and the new page command is sent in accordance with the reference color, with regard to the other colors, since raster data delayed from the reference color by the time of only each offset value has been sent, the processes of the new page command according to the timing of the reference color cannot be immediately performed.

Now, considering a procedure to form data for the waterproof reinforcement agent in the printer apparatus, it is necessary to execute the following procedure.

The print data is obtained from the host apparatus and written into the memory . . . <1>

The print data developed on the memory is read out and converted into the actual print image and is again written onto the memory . . . <2>

The print image is read out with respect to each color that is printed at the same position . . . <3>

A pattern of the waterproof reinforcement agent is determined on the basis of the print images and is written onto the memory . . . <4>

The actual print images derived by the above steps <2> and <4> are transmitted to the print head . . . <5>

As compared with the case where the waterproof reinforcement agent is not used, the processing steps <3> and <4> are newly added. According to an installation example of a certain printer apparatus, the following processes have been installed.

<1> DMA transmission by a dedicated circuit

<2> Software process by the CPU

<3> Software process by the CPU

<4> Software process by the CPU

<5> DMA transmission by a dedicated circuit

With respect to the above installation example, when comparing the traffics of the image data flowing on the data bus, they are as follows.

| | | |
|---|---|---|
| <1> | Absence 1.0 | Presence 1.0 |
| <2> | Absence 2.0 | Presence 2.0 |
| <3> | Absence 0.0 | Presence 1.0 |
| <4> | Absence 0.0 | Presence 1.25 |
| <5> | Absence 1.0 | Presence 1.25 |

The data flowing on the data bus:

4.0:6.5 . . . 1.625 times

The data that is processed by the CPU:

2.0:4.25 . . . 2.125 times

Thus, the data amounts are remarkably increased. In this case, since it is possible to considered that most of the data flowing on the bus is occupied by the image data, when considering that the above function is installed in the printer, as compared with the case where it is unnecessary to form data for the waterproof reinforcement agent, it is necessary to raise a data processing amount per unit time by using a method of improving an operation clock, expanding a width of of the data bus, or the like. Even by using any one of the above methods, it cannot help avoiding an increase in costs.

SUMMARY OF THE INVENTION

In consideration of the above conventional problems, it is an object of the invention to provide an information processing apparatus, a data processing method, and an information processing system in which in the case where a part of processes performed in an image output apparatus are shifted to driver software for an image output apparatus, program parts depending on the individual installation of the image output apparatus can be more easily formed, an increase in code amount of driver software can be suppressed and the maintenance and management of software can be improved. It is also an object of the invention to provide a computer readable memory medium.

Another object of the invention is to provide a cheap printer by reducing a scale of hardware of a memory of a printer or the like as small as possible.

Still another object of the invention is to make it easy to develop a printer driver program.

To accomplish the above objects, according to the invention, there is provided an information processing apparatus comprising: forming means for forming predetermined image information; a plurality of modules each for processing and forming the predetermined image information in accordance with the characteristics of each output apparatus; and means for switching the plurality of modules in accordance with a kind of output apparatus and outputting the information processed and formed by the switched module to the output apparatus.

According to the invention, there is provided an information processing apparatus comprising: forming means for forming predetermined image information; a plurality of modules each for processing and forming the predetermined image information in accordance with characteristics of each output apparatus; and means for switching the plurality of modules in accordance with kind information of an output apparatus obtained form the output apparatus and outputting the information formed by the switched module to the output apparatus.

According to the invention, there is provided a data processing method of using a plurality of modules each for processing and forming predetermined image information in accordance with characteristics of each output apparatus, comprising the steps of: switching the plurality of modules in accordance with the kind of output apparatus; and outputting the information processed and formed by the switched module to the output apparatus.

According to the invention, there is provided a data processing method of using a plurality of modules each for processing and forming predetermined image information in accordance with characteristics of each output apparatus, comprising the steps of: switching the plurality of modules in accordance with kind information of the output apparatus obtained from the output apparatus; and transmitting the information processed and formed by the switched module to the output apparatus.

According to the invention, there is provided a computer readable memory medium in which a program to use a plurality of program modules each for processing and forming predetermined image information in accordance with characteristics of each output apparatus has been stored, wherein the program comprises the steps of: switching the plurality of program modules in accordance with a kind of the output apparatus; and outputting the information processed and formed by the switched module to the output apparatus.

According to the invention, there is provided a computer readable memory medium in which a program to use a plurality of program modules each for processing and forming predetermined image information in accordance with characteristics of each output apparatus has been stored, wherein the program comprises the steps of: switching the plurality of program modules in accordance with kind information of the output apparatus obtained from the output apparatus; and outputting the information processed and formed by the switched module to the output apparatus.

According to the invention, there is provided an information processing apparatus comprising: memory means for storing a printer driver program constructed by a forming module to form image data and a second module to process the image data formed by the forming module in accordance with characteristics of a head of a printer; and executing means for executing the printer driver program stored in the memory means.

According to the invention, there is provided a method of forming a printer driver program, comprising the steps of; forming a first module to form image data; and forming a second module to process the image data formed by the first module in accordance with characteristics of a head of the printer.

According to the invention, there is provided a memory medium in which a printer driver program which is executed by a computer has been stored, wherein the program comprises: a forming module for forming image data; and a second module for processing the image data formed by the forming module in accordance with characteristics of a head of a printer.

DETAILED DESCRIPTION OF THE PREFERRED EMBODIMENTS

Embodiments of the invention will now be described hereinbelow with reference to the drawings.

First Embodiment

Figure 1:
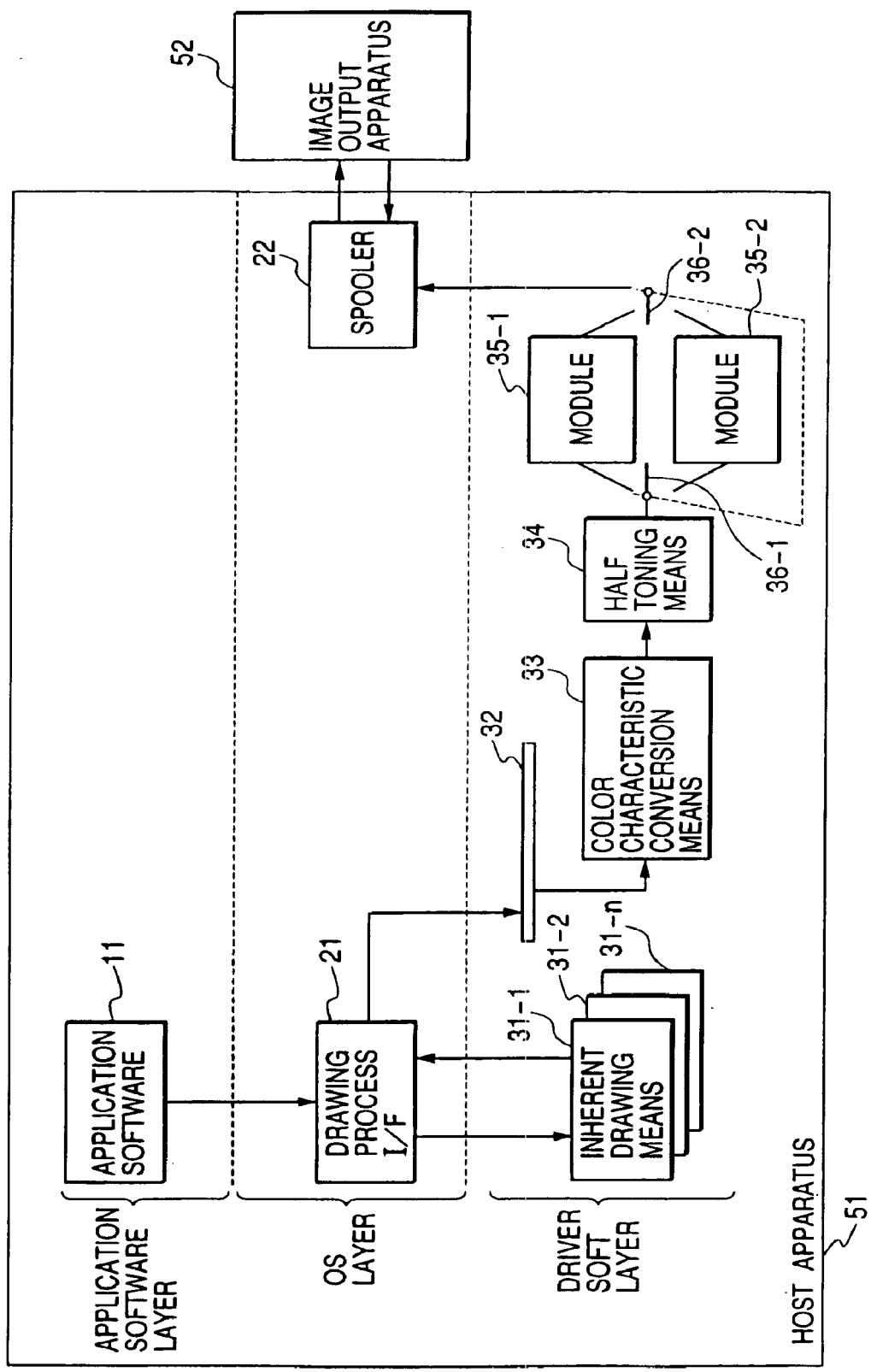
FIG. 1 is a block diagram showing a structure of driver software which is used in an information processing system according to the first embodiment of the invention.
Figure 2:
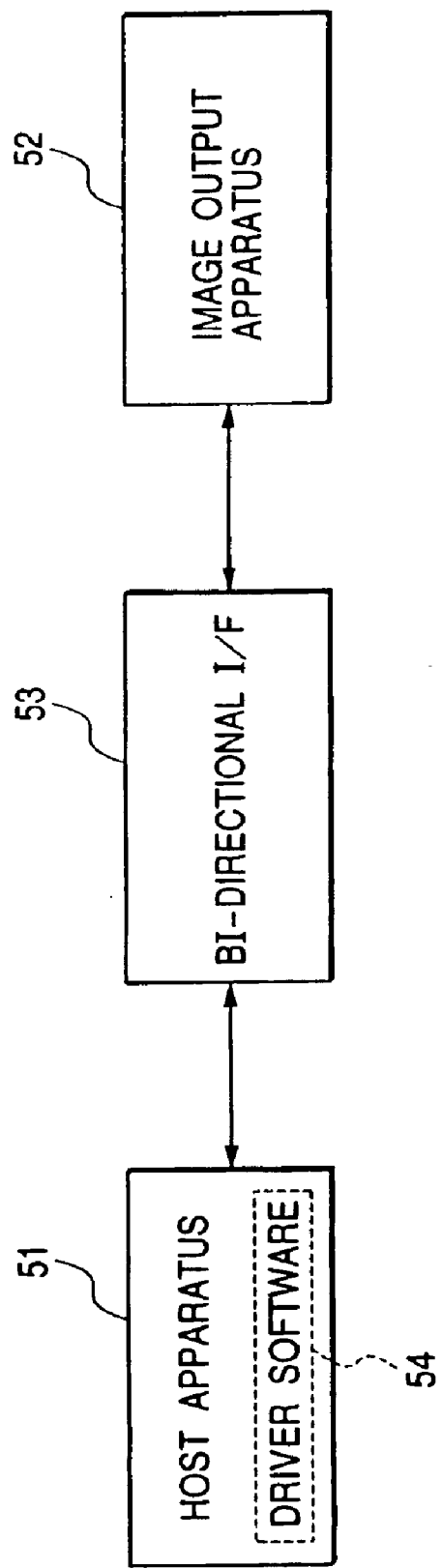
FIG. 2 is a block diagram showing a schematic construction of the information processing system according to the first embodiment of the invention.

FIG. 1 is a block diagram showing a structure of driver software which is used in an information processing system according to the first embodiment of the invention. FIG. 2 is a block diagram showing a schematic construction of the information processing system according to the first embodiment of the invention.

First, in FIG. 2, the information processing system of the embodiment comprises a host apparatus 51 constructed by a personal computer or the like and an image output apparatus 52 constructed by a printer or the like. The host apparatus 51 and image output apparatus 52 are connected via a bi-directional interface 53. Driver software 54 of the invention has been loaded in a memory of the host apparatus 51.

In the invention, attention is paid to a point that most of the image information processing works depending on a kind of image output apparatus in the driver software are executed to quantized image information, and by introducing a group of a plurality of modules (35-1 and 35-2 in FIG. 1) having a unified input/output interface into such a portion, it is tried to solve the foregoing problem. That is, by providing interface means on a program which can unitedly handle the portions which individually depend on the image output apparatus, program parts depending on the individual installation of an image processing apparatus can be more easily formed and it is possible to realize a structure such that a basic processing portion of the driver software is independent from the individual image processing apparatus.

A line-divided image converted into a quantum value is subjected to an image process that is peculiar to the image output apparatus by any one of the group of modules having the united input/output interface and is further added with a data compression/print command. After that, the resultant formed data is handed to the image output apparatus 52 via a spooler prepared in the OS (Operating System).

A case where an image is outputted to the image output apparatus by application software will now be specifically explained hereinbelow with reference to flowcharts of FIGS. 3 and 4 together with FIG. 1.

As shown in FIG. 1, application software 11 is provided in a layer of the application software. A drawing process interface 21 to receive drawing commands from the application software 11 and a spooler 22 to hand formed image data to the image output apparatus 52 such as an ink jet printer or the like are provided in a layer of the OS.

In a layer of the driver software, there are provided: inherent drawing means 31-1, 31-2, ..., and 31-n in each of which an apparatus inherent representation format has been stored; line-divided image information receiving means 32 for receiving line-divided image information from the OS; color characteristic conversion means 33 for converting from a calorimetric system in the driver into a device inherent colorimetric system; half toning means 34 for converting into a quantum value indicative of a state of each pixel of the device; the plural modules 35-1 and 35-2 of the invention mentioned above; and virtual switches 36-1 and 36-2 for switching between the modules 35-1 and 35-2.

As mentioned above, both of the modules 35-1 and 35-2 are a group of modules having the united input/output interface in the invention. For example, the module 35-1 is a module for an image output apparatus of ordinary YMCK heads which do not need any emission data for a waterproof reinforcement agent. The module 35-2 is a module having logical means for determining an emission pattern of a waterproof reinforcement agent of an image output apparatus comprising ordinary YMCK heads and heads for the waterproof reinforcement agent.

The emission data for the waterproof reinforcement agent is data obtained by adding data for the head for the waterproof reinforcement agent in which the OR of the data of YMCK is got to binary data for the ordinary YMCK heads.

The virtual switches 36-1 and 36-2 are virtual switches provided in a program and switch the modules 35-1 and 35-2 according to which image output apparatus is to be used or according to which function of the image output apparatus is to be used when the image is formed. Specifically speaking, on a display screen of the printer driver, when the user selects a printer and instructs to execute the printing by the selected printer, they are switched to the module corresponding to the heads of the selected printer.

When the application software 11 outputs an image to the image output apparatus 52, first, the application software 11 issues drawing commands of characters, line segments, a figure, a bit map, etc. through the drawing process interface 21 of the OS (step S1).

When a drawing command constructing a screen/paper surface is completed (step S2), the OS converts each drawing command from an internal format of the OS into an apparatus inherent representation format (obtained by line dividing each drawing unit) while accessing the inherent drawing means 31-1, 31-2, . . . , and 31-$n$ in the driver software (step S3). After that, the OS hands the screen/paper surface as line-divided image information to the driver software (step S4).

In the driver software, color characteristics of the device are corrected by the color characteristic conversion means 33 and a conversion from the calorimetric system in the driver software into the calorimetric system peculiar to the device is performed (step S5). Further, a conversion (half toning) to a quantum value indicative of a state of each pixel of the device is performed by the half toning means 34 (step S6). The conversion to the quantum value corresponds to a format of data to be processed by the image output apparatus. For example, when the recording by the image output apparatus is performed on the basis of binary data, the image data is binarized. When the recording by the image output apparatus is performed on the basis of multivalue data (to perform the recording by dense/light ink and the recording by large/small ink), the image data is converted into multivalue.

Each of the modules 35-1 and 35-2 receives the quantized (binarized or multivalued) image data (step S7). The modules 35-1 and 35-2 process the quantized image information in accordance with the characteristics of the image output apparatus by different methods. In the module 35-2, the emission pattern of the waterproof reinforcement agent is determined with reference to the received quantization data and, further, a data compression and an addition of a command header are performed in both of the modules (step S8). The virtual switches 36-1 and 36-2 which operate in an interlocking relation switch the modules 35-1 and 35-2 in accordance with the kind of image output apparatus 52 selected by the user who wants to output an image (step S9).

After that, the modules 35-1 and 35-2 hand the formed data to the spooler 22 provided in the OS (step S10) and performs a data output to the image output apparatus 52 (step S11).

Figure 3:
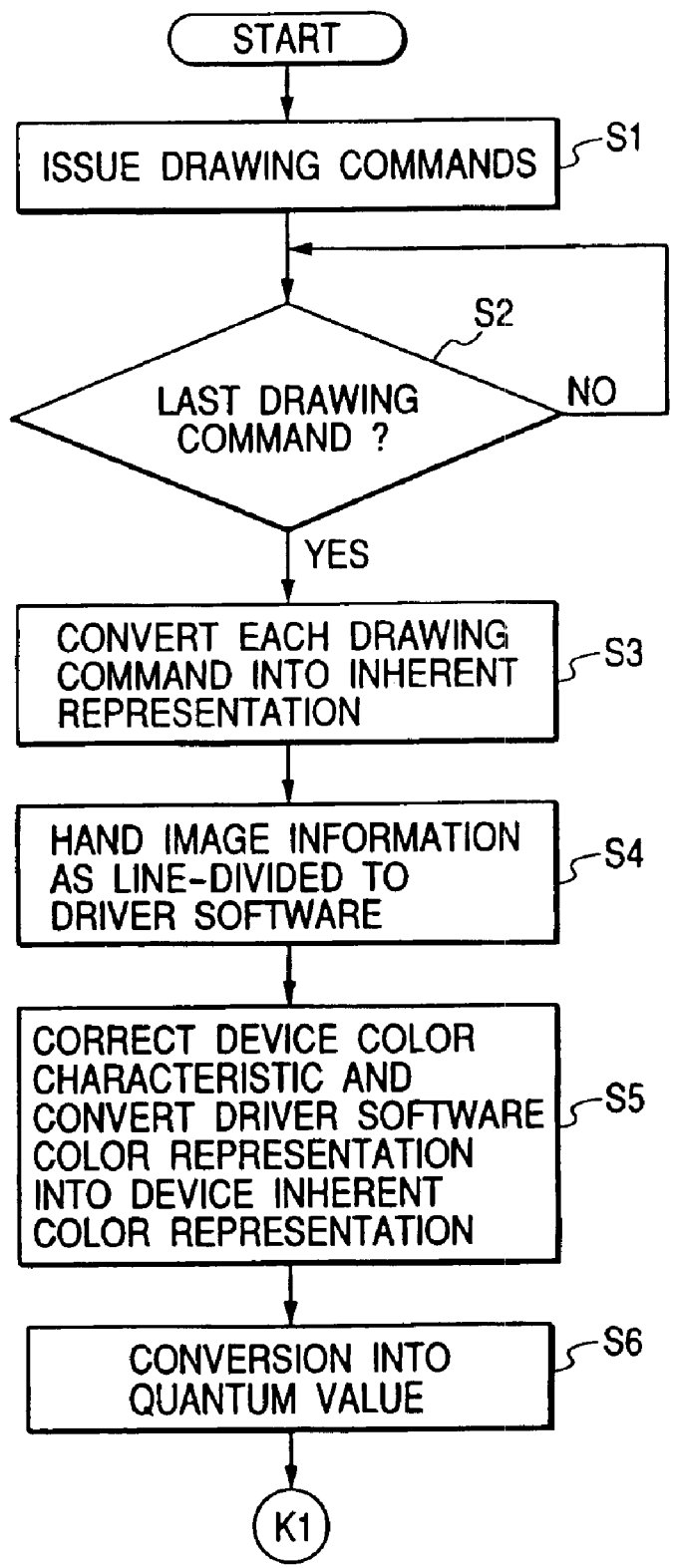
FIG. 3 is a flowchart showing the operation of the first embodiment.
Figure 4:
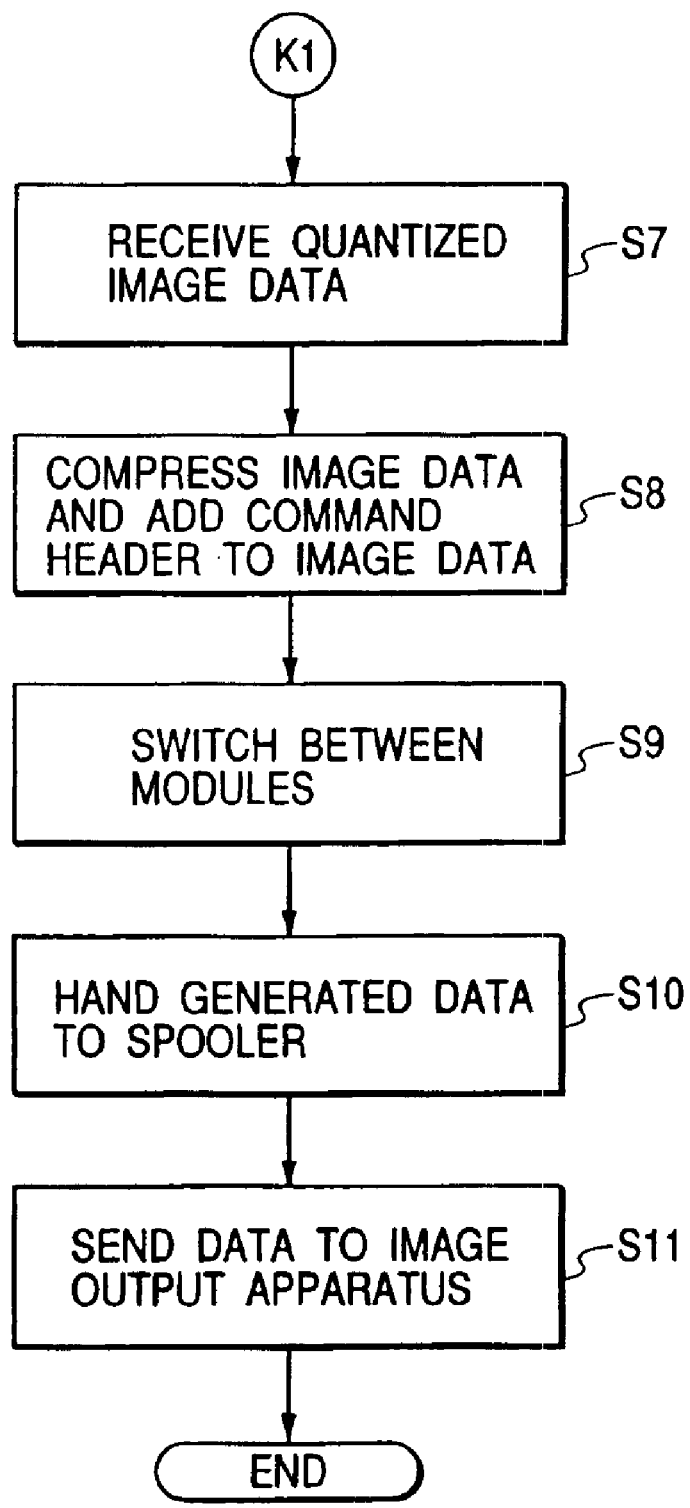
FIG. 4 is a flowchart which continues from FIG. 3.

In the embodiment, by storing a program according to the flowcharts of FIGS. 3 and 4 into a storing device in the host apparatus 51 and making the program operative, the above control method can be realized.

According to the embodiment as mentioned above, since the modules 35-1 and 35-2 as interface means on the program which can unitedly handle the portions which individually depend on the image output apparatus are provided, the program parts depending on the individual installation of the image processing apparatus can be easily formed. Thus, in the case where a part of the processes performed in the image output apparatus are shifted to the driver software, an increase in code amount of the driver software can be suppressed.

Since the basic processing portion of the driver software can be constructed so as to be independent on the individual image processing apparatus, a sharing of a data process between the driver software and the image output apparatus can be flexibly changed without losing the construction of the driver software and it is advantageous in terms of the maintenance and management of the software.

Second Embodiment

Figure 5:
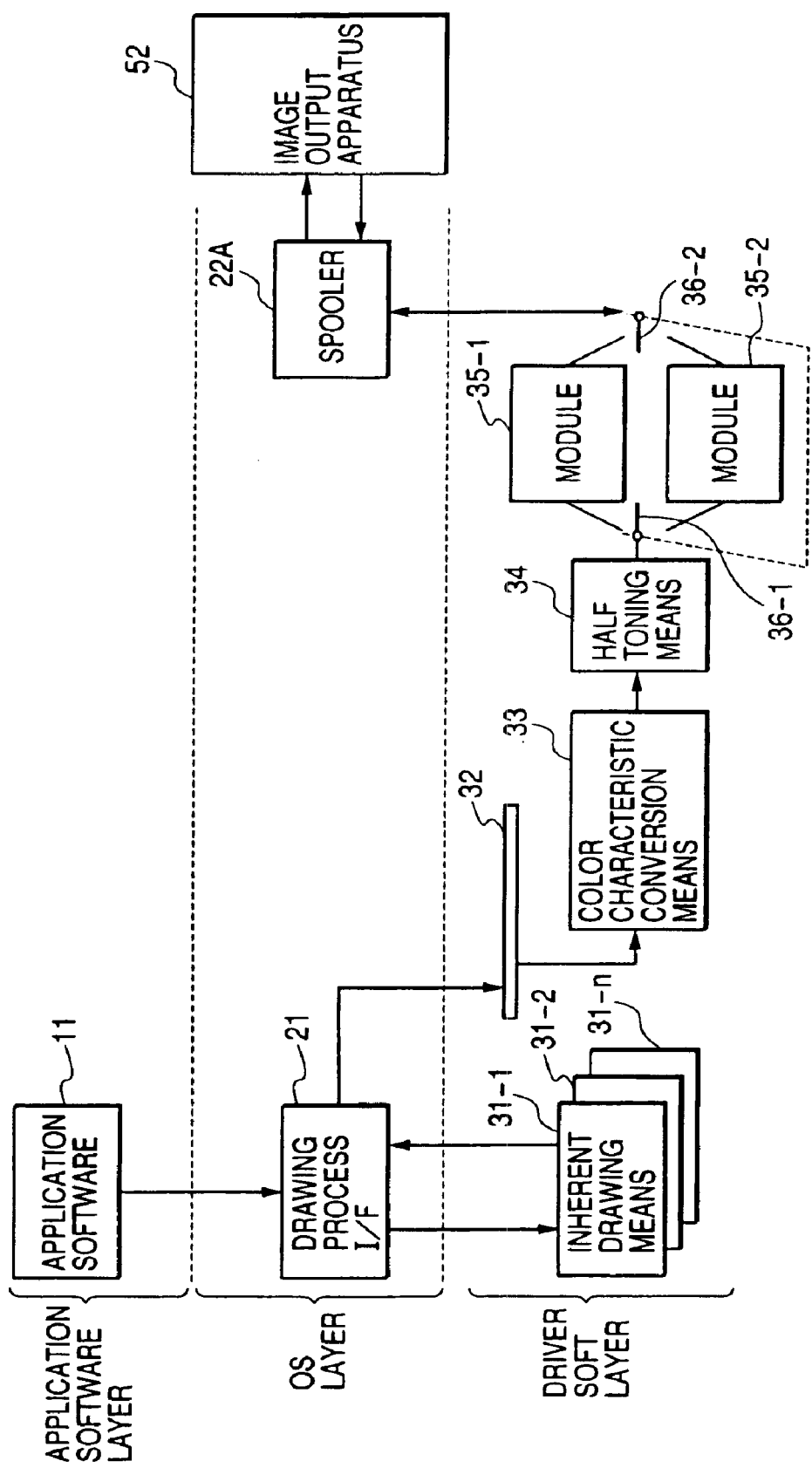
FIG. 5 is a block diagram showing a structure of driver software which is used in an information processing system according to the second embodiment of the invention.

FIG. 5 is a block diagram showing a structure of driver software which is used in an information processing system according to the second embodiment of the invention. Component elements common to those in FIG. 1 are designated by the same reference numerals.

In the first embodiment, when the user who wants to output an image selects the image output apparatus 52, the modules 35-1 and 35-2 are switched in accordance with the kind of image output apparatus 52 by using the virtual switches 36-1 and 36-2. On the other hand, according to the embodiment, the kind of image output apparatus 52 connected at present is automatically received via the bi-directional interface 53 which connects the host apparatus 51 and image output apparatus 52 and the modules 35-1 and 35-2 are switched, thereby further improving convenience.

That is, a spooler 22A of the OS receives data indicative of the kind (kind of print head) from the image output apparatus 52 connected at present through the bi-directional interface 53 and switches the virtual switches 36-1 and 36-2 on the basis of the received data. Thus, the modules 35-1 and 35-2 are switched in accordance with the kind of image output apparatus 52. After that, formed data is sent from the modules 35-1 or 35-2 to the spooler 22A, thereby performing the data output to the image output apparatus 52.

The invention is not limited to the apparatus of the embodiment mentioned above but can be also applied to a system constructed by a plurality of equipment or to an apparatus comprising one equipment. It will be obviously understood that the invention is also accomplished by a method whereby program codes of software to realize the foregoing functions of the embodiments are stored in a memory medium, the memory medium is supplied to a system or an apparatus, and a computer (or a CPU or an MPU) of the system or apparatus reads out the program codes stored in the memory medium and executes them.

In this case, the program codes themselves read out from the memory medium realize the functions of the embodiments mentioned above. The memory medium in which the program codes have been stored constructs the invention. As a memory medium to supply the program codes, for example, it is possible to use any one of a floppy disk, a hard disk, an optical disk, a magnetooptic disk, a CD-ROM, a CD-R, a magnetic tape, a non-volatile memory card, and an ROM. It will be also obviously understood that the invention also incorporates not only a case where the functions of the foregoing embodiments are realized by executing the program codes read out by a computer but also a case where the OS or the like which operates on the computer executes a part or all of the actual processes on the basis of instructions of the program codes and the functions of the foregoing embodiments are realized by those processes.

Further, it will be obviously understood that the invention also incorporates a case where the program codes read out from the memory medium are written into a memory provided for a function expanding board inserted in a computer or a function expanding unit connected to a computer and, after that, a CPU or the like provided for the function expanding board or function expanding unit executes a part or all of the actual processes on the basis of instructions of the program codes, and the functions of the foregoing embodiments are realized by those processes.

As another module, a module 35-3 (FIG. 11) including an offset transmission program to transmit data in accordance with the head can be also provided for an image output apparatus in which the YMCK heads are arranged in the subscanning direction.

The switching between the modules in the embodiment can be also executed at the time of installation of the printer driver.

As described in detail above, according to the embodiments, since the module functions as interface means which can unitedly handle the portions which individually depend on the output apparatuses, the program parts depending on the individual installation of the output apparatus can be easily formed. For example, an increase in code amount of the forming means constructed by the driver software can be suppressed. Further, since the basic processing portion of the driver software can be constructed so as to be independent on the individual output apparatus, a sharing of the data processes between the driver software and the output apparatus can be flexibly changed without losing the construction of the driver software. It is advantageous in terms of the maintenance and management of the software.

According to the embodiments, since the kind of output apparatus can be automatically obtained, convenience is further improved.

A specific construction of the image output apparatus 52 will now be described.

Description of an Outline of the Image Output Apparatus

Figure 6:
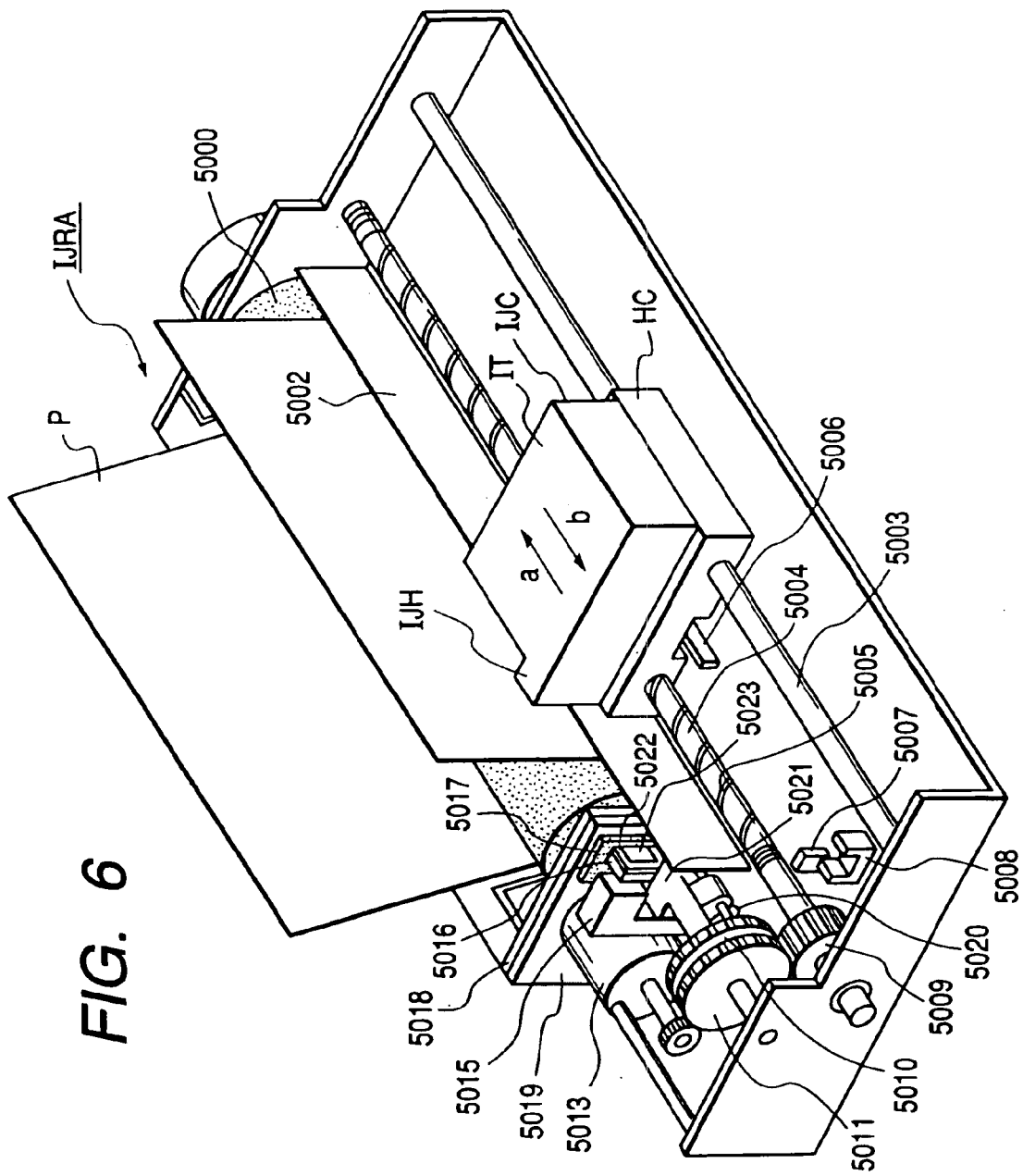
FIG. 6 is an external perspective view showing an outline of a construction of an ink jet printer IJRA according to a typical embodiment of the invention.

FIG. 6 is an external perspective view showing an outline of a construction of the ink jet printer IJRA as a typical embodiment of the invention. In FIG. 6, a lead screw 5005 rotates in an interlocking relation with a forward/reverse rotation of a driving motor 5013 through driving force transfer gears 5009 to 5011. A carriage HC which is come into engagement with a spiral groove 5004 of the lead screw 5005 has a pin (not shown). The carriage HC is supported by a guide rail 5003 and is reciprocated in the directions shown by arrows a and b. A integrated ink jet cartridge IJC in which a recording head IJH and an ink tank IT are enclosed are enclosed is mounted on the carriage HC. Reference numeral 5002 denotes a paper pressing plate for pressing a recording paper P onto a platen 5000 in the moving direction of the carriage HC. Reference numerals 5007 and 5008 denote photocouplers serving as home position detectors each for confirming the presence of a lever 5006 of the carriage in a region corresponding to the photocoupler and performing a switching of the rotating direction of the driving motor 5013 or the like. Reference numeral 5016 denotes a member for supporting a cap member 5022 to cap the front surface of the recording head IJH; 5015 a sucker for suction the air in the cap and performing a suction and a recovery of the recording head through an opening 5023 in the cap; 5017 a cleaning blade; and 5019 a member for enabling the cleaning blade to be movable in the front and rear directions. Those component elements are supported on a main unit supporting plate 5018. Obviously, the cleaning blade is not limited to a shape shown in the diagram but a well-known cleaning blade can be also applied to the embodiment. Reference numeral 5021 denotes a lever to start the suction in the suction and recovery. The lever 5021 is moved in association with the movement of a cam 5020 which is come into engagement with the carriage. A driving force from the driving motor is transferred and controlled by a well-known transfer mechanism such as a clutch switching or the like.

As for the capping, cleaning, and suction and recovery, it is constructed in a manner such that when the carriage reaches an area on the home position side, a desired process can be executed at a position corresponding to each of them by the operation of the lead screw 5005. However, if a desired operation is performed at a well-known timing, any one of them can be also applied to the embodiment.

Description of a Control Construction

A control construction to execute the recording control of the foregoing apparatus will now be described.

Figure 7:
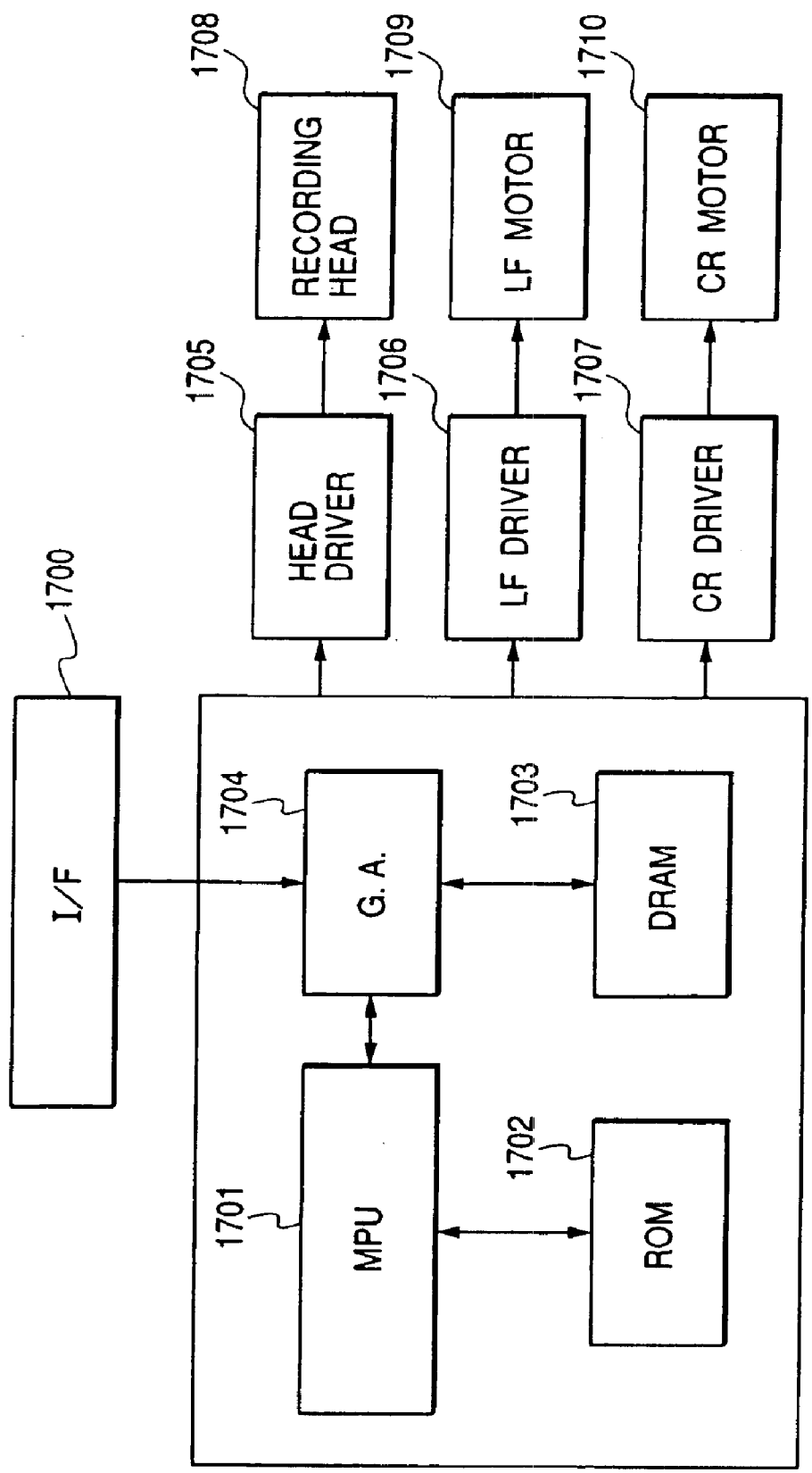
FIG. 7 is a block diagram showing a construction of a control circuit of the ink jet printer IJRA shown in FIG. 6.

FIG. 7 is a block diagram showing a construction of a control circuit of the ink jet printer IJRA. In the diagram showing the control circuit, reference numeral 1700 denotes an interface to input a recording signal; 1701 an MPU; 1702 an ROM to store a control program which is executed by the MPU 1701; 1703 a DRAM to store various data (the recording signal, recording data that is supplied to the head, and the like); 1704 a gate array (G.A.) for controlling a supply of the recording data to a recording head 1708 and for also controlling a data transfer among the interface 1700, MPU 1701, and RAM 1703. Reference numeral 1710 denotes a carrier motor (CR motor) to convey the recording head 1708; 1709 a line feed motor (LF motor) to convey a recording paper; and 1705 a head driver to drive the recording head; and 1706 and 1707 motor drivers to drive the LF motor 1709 and CR motor 1710, respectively.

The operation of the above control construction will now be described. When the recording signal is inputted to the interface 170b, the recording signal is converted into recording data for printing between the gate array 1704 and MPU 1701. The motor drivers 1706 and 1707 are driven and the recording head is driven in accordance with the recording data sent to the head driver 1705 and the recording is performed.

As mentioned above, the ink tank IT and recording head IJH can be integratedly formed and an exchangeable ink jet cartridge IJC can be also constructed. However, it is also possible to construct such that the ink tank IT and recording head IJH can be separated and, when the ink is run out, only the ink tank IT can be exchanged.

Figure 8:
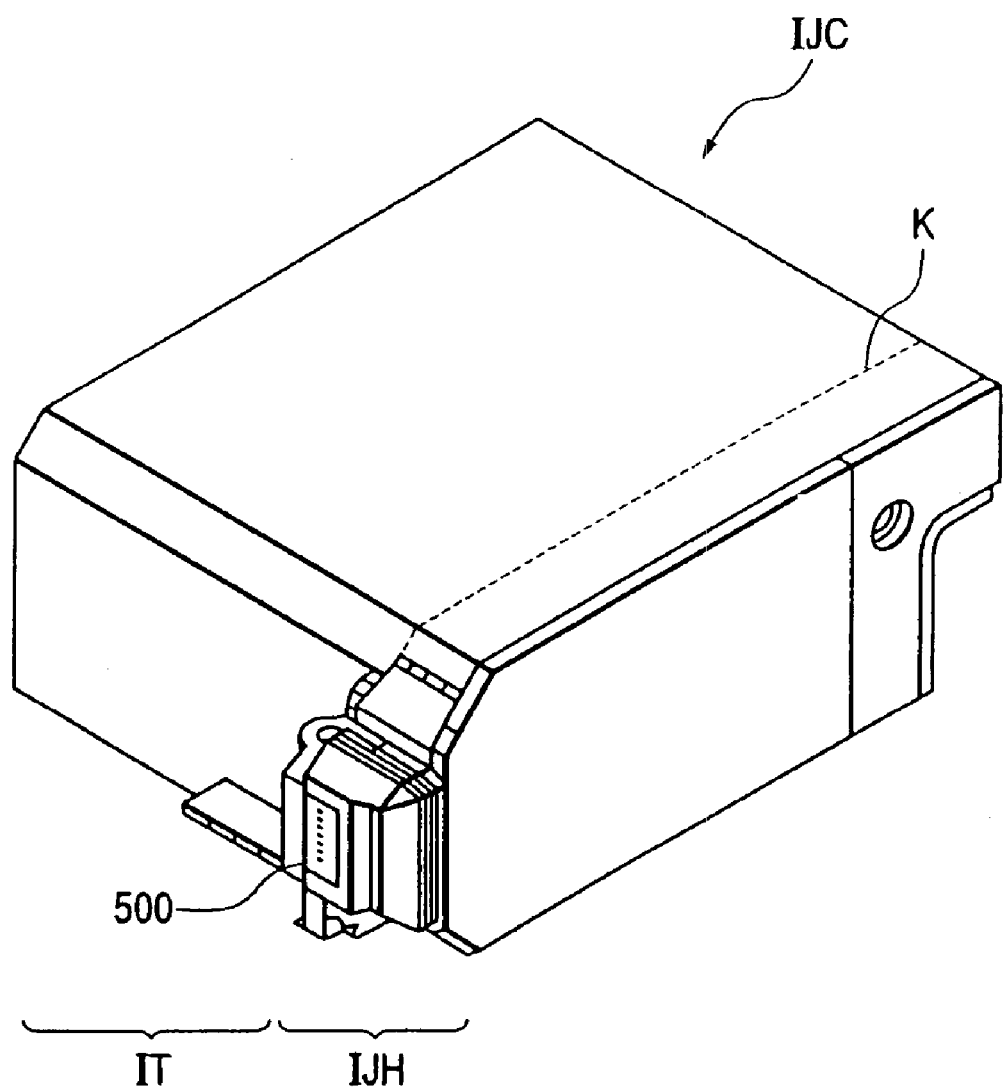
FIG. 8 is an external perspective view showing a construction of an ink jet cartridge IJC in which an ink tank and a head can be separated.

FIG. 8 is an external perspective view showing a construction of the ink jet cartridge IJC in which the ink tank and the head can be separated. In the ink jet cartridge IJC, as shown in FIG. 8, the ink tank IT and recording head IJH can be separated at a position of a boundary line K. The ink jet cartridge IJC has an electrode (not shown) to receive the electric signal which is supplied from the carriage HC side when the ink jet cartridge is mounted on the carriage HC. In response to the electric signal, the recording head IJH is driven as mentioned above and the ink is emitted.

In FIG. 8, reference numeral 500 denotes an ink emitting port array. A fibrous or porous ink absorbent is enclosed in the ink tank IT in order to hold the ink. The ink is held by the ink absorbent.

Although the above embodiment has been described on the assumption that a droplet which is emitted from the recording head is the ink and, further, a liquid which is contained in the ink tank is the ink, the contained matter is not limited to the ink. For example, a matter such as a treatment liquid which is emitted to a recording medium in order to raise fixing performance or waterproof performance of a recording image can be also enclosed in the ink tank in order to improve the image quality.

According to the foregoing embodiment, particularly, even among the ink jet recording systems, by using a system which has means (for example, electro-thermal transducer, laser beam, or the like) for generating a thermal energy as an energy which is used to emit the ink and causes a state change of the ink by the thermal energy, a high density and a high fineness of the recording can be accomplished.

As for its typical construction and principle, for example, it is preferable to embody the invention by using the fundamental principle disclosed in the specifications of the U.S. Pat. Nos. 4,723,129 and 4,740,796. This system can be applied to any one of what are called an on-demand type and a continuous type. However, particularly, in case of the on-demand type, at least one driving signal which corresponds to recording information and gives a sudden temperature increase exceeding a film boiling is applied to a sheet in which a liquid (ink) is held or an electro-thermal transducer arranged in correspondence to a liquid channel, thereby allowing the electro-thermal transducer to generate a thermal energy and causing a film boiling on a heat operating surface of the recording head. Since an air bubble in the liquid (ink) corresponding to the driving signal in a one-to-one corresponding relation can be formed, thus, it is effective. The liquid (ink) is emitted via an opening for emission by the growth and contraction of the air bubble, thereby forming at least one droplet. By setting the driving signal into a pulse shape, the growth and contraction of the air bubble are instantaneously properly performed, so that the emission of the liquid (ink) having particularly an excellent response speed can be accomplished and it is more preferable.

As a pulse-like driving signal, the signal as disclosed in the specifications of U.S. Pat. Nos. 4,463,359 and 4,345,262 is suitable. If the conditions disclosed in the specification of U.S. Pat. No. 4,313,124 of the invention regarding the temperature increase rate of the heat operating surface are used, the further excellent recording can be performed.

As a construction of the recording head, besides the combination construction (linear liquid channel or right-angle liquid channel) of the emitting ports, liquid channel, and electro-thermal transducer as disclosed in each of the above specifications, constructions using the structures disclosed in U.S. Pat. Nos. 4,558,333 and 4,459,600 in which the heat operating surface is arranged in a bending area are also included in the invention. In addition, it is also possible to use the construction disclosed in JP-A-59-123670 in which a slot common to a plurality of electro-thermal transducers is used as an emitting portion of the electro-thermal transducer or the construction based on JP-A-59-138461 disclosing the construction in which an opening to absorb a pressure wave of the thermal energy is made correspond to the emitting portion.

Further, as a recording head of the full line type having a length corresponding to a width of the maximum recording medium which can be recorded by the recording apparatus, it is also possible to use any one of a structure such that the length is satisfied by the combination of a plurality of recording heads as disclosed in the foregoing specifications and a structure as a single recording head integratedly formed.

In addition, it is possible to use not only the recording head of the cartridge type in which the ink tank is integratedly provided for the recording head itself as described in the foregoing embodiments but also a recording head of an exchangeable chip type in which, when it is attached to the apparatus main unit, an electrical connection with the apparatus main unit or the supply of the ink from the apparatus main unit can be performed.

If recovering means, spare means, and the like for the recording head are added to the construction of the recording apparatus described above, since the recording operation can be further stabilized, it is preferable. Specifically speaking, as those means, there are capping means for the recording head, cleaning means, pressurizing or sucking means, electro-thermal transducer or another heating element, spare heating means by a combination of them, and the like. If a spare emitting mode to perform another emission different from the recording is provided, it is effective in order to stably perform the recording.

Further, the recording mode of the recording apparatus is not limited to only the recording mode of only a main stream color such as black or the like, but the recording head can be integratedly constructed or a plurality of recording heads can be also combined. It is also possible to use an apparatus having at least one of a multicolor of different colors and a full color by color mixture.

Although the above embodiment has been described on the assumption that the ink is a liquid, it is also possible to use ink which is solidified at a room temperature or lower or ink which is softened or liquefied at a room temperature. According to the ink jet system, generally, a temperature of the ink itself is adjusted within a range of (30° C.≦temperature≦70° C.), thereby allowing a viscosity of the ink to lie within a stable emission range. Therefore, it is sufficient to use the ink which is liquefied when a use recording signal is applied.

In addition, in order to positively prevent a temperature increase due to a thermal energy by actively using an energy of a state change from a solid state of the ink to a liquid state or in order to prevent the evaporation of the ink, ink which is solidified in a normal state and is liquefied by heating can be also used. In brief, the invention can be applied to a case of using ink having a nature such that it is liquefied for the first time by applying a thermal energy, such as ink which is liquefied by applying a thermal energy according to a recording signal and emits an ink droplet or ink which has already started to be solidified at a time point when it reaches the recording medium or the like. In such a case, as disclosed in JP-A-54-56847 or JP-A-60-71260, it is possible to set the ink into a form such that it faces the electro-thermal transducer in a state where the ink is held as a liquid or solid matter in a concave portion or a through hole of a porous sheet. In the invention, a method of executing the foregoing film boiling system is the most effective for each ink as mentioned above.

Further, the construction of the recording apparatus according to the invention is not limited to a form such that it is integratedly or separately provided as an image output terminal of information processing equipment of a computer or the like. It is also possible to use a form of a copying apparatus combined with a reader or the like and, further, a form of a facsimile apparatus having a transmitting and receiving function.

Hardware Construction of the Host Apparatus 51 and Image Output Apparatus 52

A hardware construction of the host apparatus 51 and image output apparatus 52 will now be described.

Figure 9:
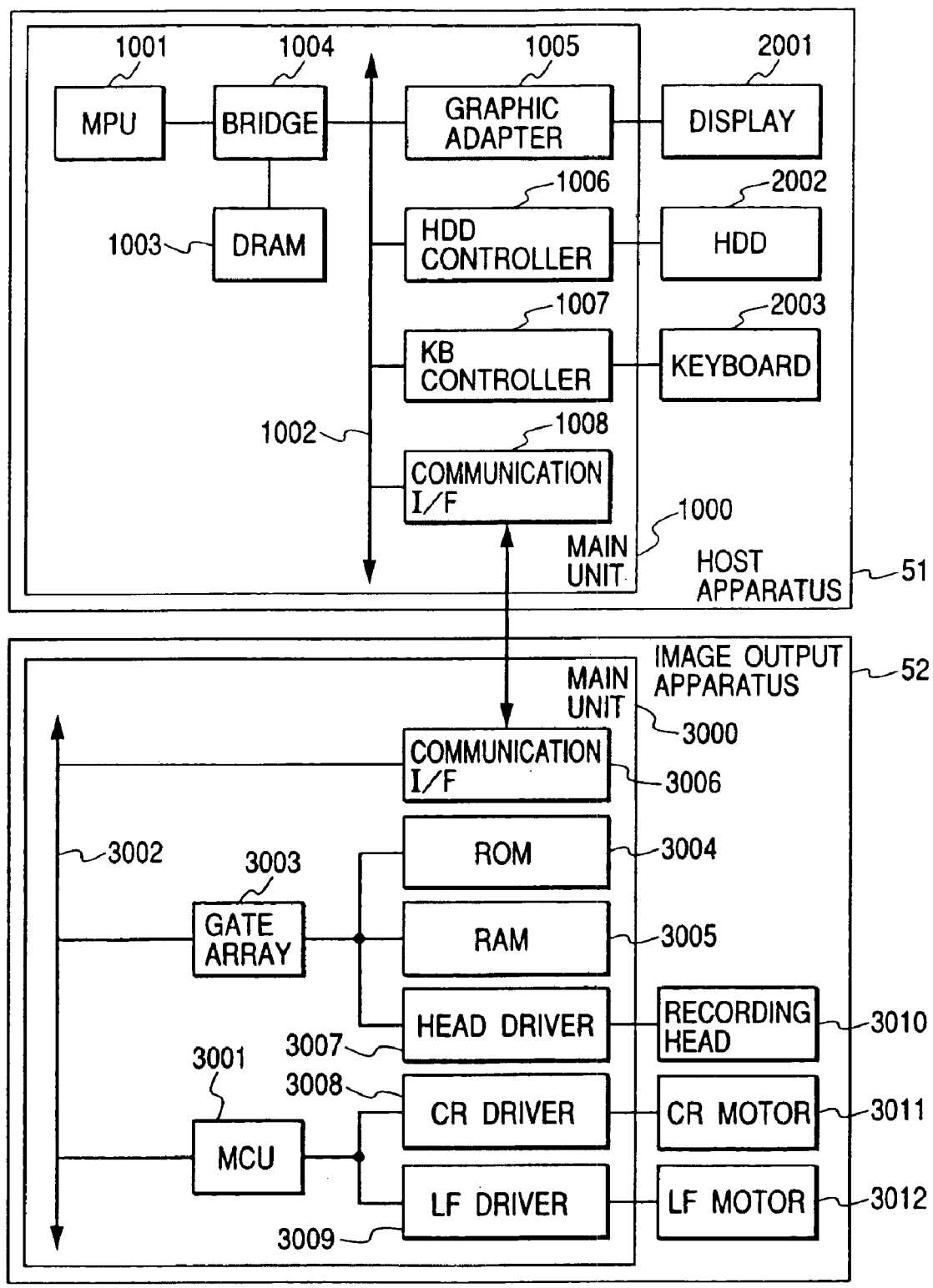
FIG. 9 is a system block diagram according to the invention.

In FIG. 9, reference numeral 1000 denotes a main unit of the host apparatus; 51 the whole host apparatus including peripheral apparatuses; 3000 a main unit of the image output apparatus; and 52 the whole image output apparatus including a recording head 3010, a carrier motor 3011 to drive the carrier for conveying the recording head, and a line feed motor 3012 to convey the paper. The image output apparatus 52 is shown as an example of embodying the schematic construction shown in FIG. 2 mentioned above as a specific structure.

In the host apparatus main unit 1000, reference numeral 1001 denotes an MPU to control the whole host apparatus in accordance with a control procedure stored in a DRAM 1003; 1002 a bus to connect the whole system; 1003 the DRAM to temporarily store programs which are executed by the MPU 1001, data, and the like; 1004 a bridge to connect a system bus, a memory bus, and the MPU; and 1005 a graphic adapter having a control function to display graphic information onto a CRT.

Reference numeral 1006 denotes an HDD controller to interface with a hard disk drive (HDD) apparatus 2002; 1007 a keyboard controller to interface with a keyboard; and 1008 a communication interface as a parallel interface to communicate with the image output apparatus main unit 3000 in accordance with the IEEE1284 standard.

A display 2001 to display graphic information or the like to the operator is connected to the host apparatus main unit 1000 via the graphic adapter 1005. In the embodiment, the display 2001 is a connected cathode ray tube (CRT) display. Further, the HDD apparatus 2002 as a storing device of a large memory capacity in which the programs and data have been stored and a keyboard 2003 are connected to the host apparatus main unit.

In the image output apparatus main unit 3000, reference numeral 3001 denotes an MCU (micro controller unit) which has both of a control program executing function and a peripheral apparatus control function and controls the whole image output apparatus 52; 3002 a system bus; and 3003 a gate array in which a mechanism to supply the recording data to the print head, a memory address decoding mechanism, a mechanism to generate a control pulse to the carrier motor, and the like are enclosed as control circuits.

Reference numeral 3004 denotes an ROM to store control programs which are executed by the MCU 3001, host print information, and the like; and 3005 indicates a DRAM to store various data (image recording information, recording data which is supplied to the head, etc.).

Reference numeral 3006 denotes a communication interface as a parallel interface to communicate with the host apparatus 51 in accordance with the IEEE1284 standard; and 3007 indicates a head driver to convert into an electric signal to drive the recording head on the basis of a head recording signal outputted from the gate array 3003.

Reference numeral 3008 denotes a motor driver to convert a carrier motor control pulse generated from the gate array 3003 into the electric signal to actually drive the carrier motor; and 3009 indicates a motor driver to convert a line feed motor control pulse generated from the MCU into an electric signal to actually drive the line feed motor.

Figure 10:
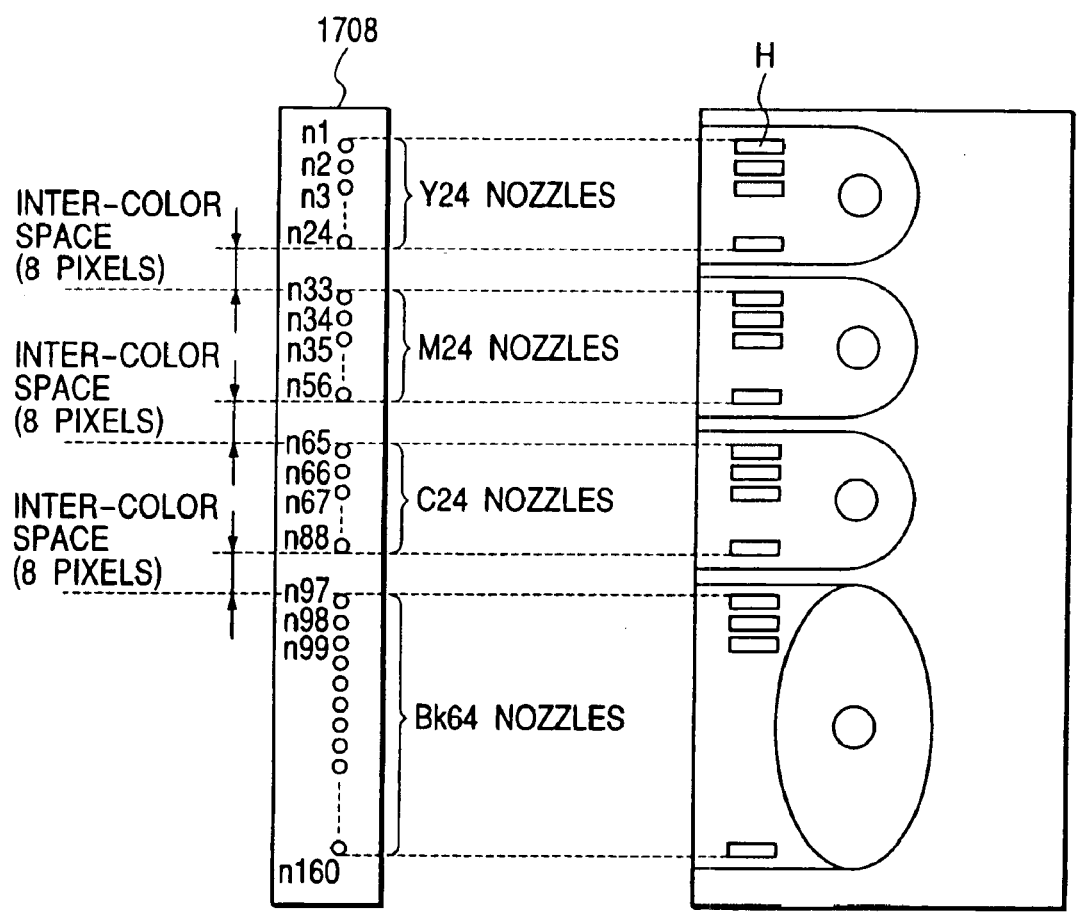
FIG. 10 is a diagram showing an example of a construction of a recording head which is used in a recording apparatus of the embodiment.

Subsequently, the recording head which is used in the embodiment will now be described with reference to FIG. 10. FIG. 10 is a diagram showing an example of a construction of the recording head which is used in the image output apparatus of the first embodiment.

The recording head 3010 of the image output apparatus 52 of the embodiment shown in FIG. 10 is a recording head in which every 24 recording elements to record images of recording colors of Y, M, and C and 64 recording elements to record an image of a recording color of Bk are constructed in one chip. An inter-color space corresponding to B elements (pixels) exists between the recording colors.

As shown in FIG. 10, nozzles n1 to n160 are sequentially formed in accordance with the order of Y, M, C, and Bk from the top. An example of a chip of the recording heads of the above structure is shown on the right side of FIG. 10. Heat generators H serving as recording elements of Y, M, C, and Bk are arranged and a space corresponding to 8 pixels (nozzle gap) is formed between the groups of recording elements of each color.

Although such a space is not always necessary, it is provided because an ink chamber of each color can be more easily formed on the chip of the recording head 3010 by providing the inter-color space.

In the embodiment, the ink chamber of each color, each nozzle, an ink injection channel, or the like is formed by a molding material due to a die molding process. The molded members are pressed onto the recording head chip by a spring (not shown) and are sealed with a sealing material together with the spring, thereby constructing them. Since any one of means for constructing the ink chamber and nozzles by a dry film and means for constructing by another method can be applied to the invention, their detailed description is omitted.

Module Including an Offset Transmission Program

Figure 11:
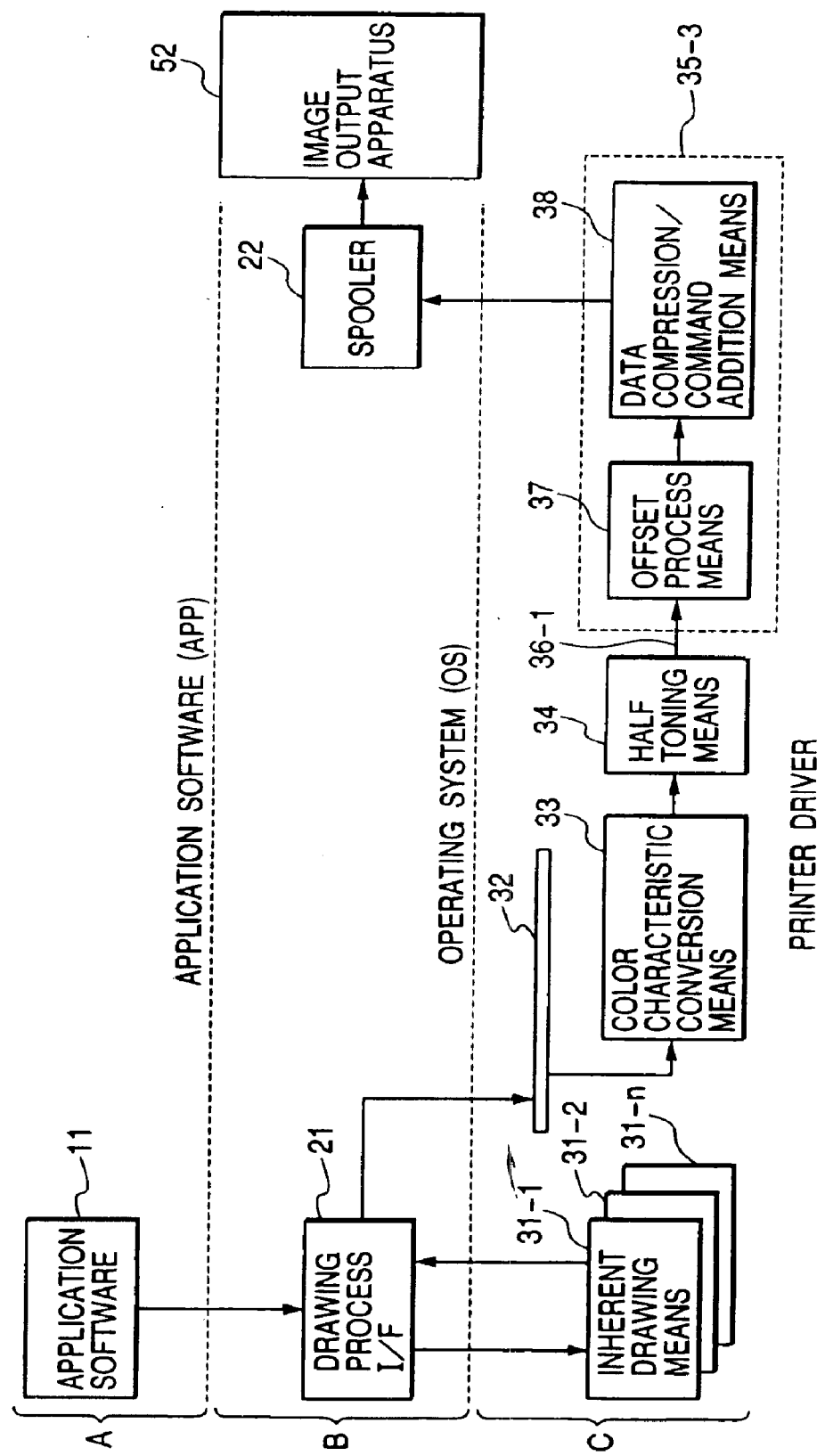
FIG. 11 is a diagram for explaining a construction of driver software of the embodiment.

Subsequently, the module 35-3 including the offset transmission program as another module mentioned above will now be specifically explained with reference to the drawings. First, driver software which is installed in the host apparatus will now be described with reference to FIG. 11. FIG. 11 is a diagram for explaining a construction of the driver software of the embodiment.

The driver software of the embodiment is expressed by a layer shown at C in FIG. 11.

In FIG. 11, A denotes a layer called application software (hereinafter, abbreviated to as "App"); B a layer constructing an operating system (hereinafter, abbreviated to as "OS"); and C the layer of the driver software.

In the program shown in the App 11, when the operator tries to output an image to the recording apparatus, the App issues drawing commands of characters, line segments, a figure, a bit map, etc. via the drawing process interface 21 of the OS.

When the drawing commands constructing the screen/paper surface are completed, the OS converts each drawing command from an internal format of the OS into an apparatus inherent representation format (in which each drawing unit is line divided) while accessing the inherent drawing means in the drivers 31-1 to 31-n. In this case, the image data is handed to the color characteristic conversion means 33 as dot-sequential raster data in which each color of RGB is expressed by 8 bits/pixel.

The color characteristic conversion means 33 corrects the color characteristics of the device and converts them from a calorimetric system in the driver into a calorimetric system peculiar to the device. In this case, they are handed to the half toning means 34 as dot-sequential raster data in which each color of KCMY is expressed by 8 bits/pixel.

The half toning means 34 performs a conversion to a quantum value indicative of a state of each pixel of the device and hands the quantum value to offset process means 37 as line-sequential data of 1 to 4 bits/pixel for each color. The offset process means 37 hands the image data to data compression/command addition means 38 as line-sequential data of 1 to 4 bits/pixel of each color of KCMY added with the offset in the inherent subscanning direction every color in accordance with the offset amount according to the construction of the recording head.

In the data compression/command addition means 38 performs a compression according to a PackBits format in order to improve an image transmission efficiency on the basis of the handed image data, adds a print command header, and hands resultant image data to the printer spooler 22 in the system.

The printer spooler 22 of the system transmits the image data to the image output apparatus 52 via the communication interface 1008 in accordance with a procedure predetermined in the IEEE1284.

Figure 12:
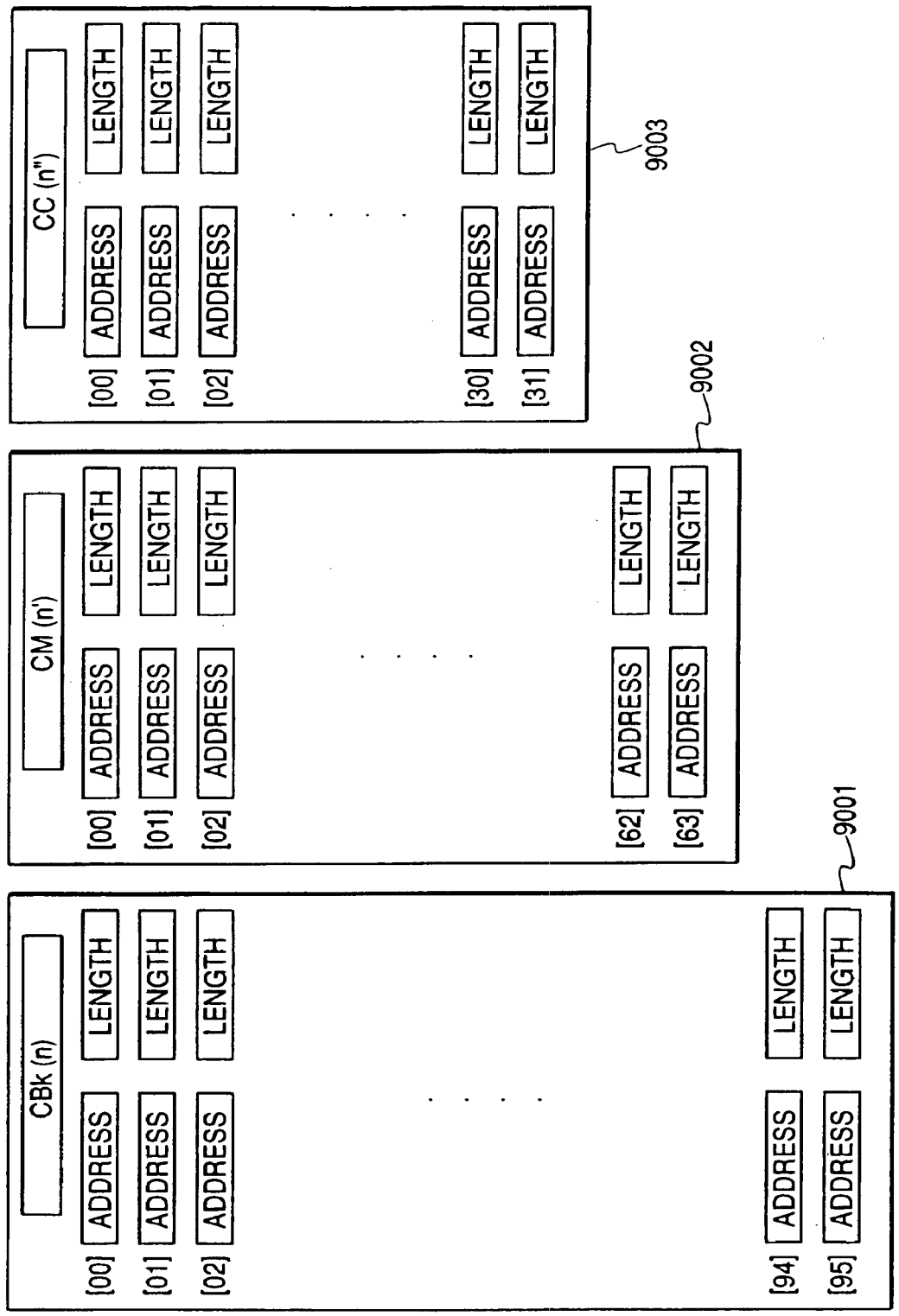
FIG. 12 is a diagram for explaining the details of an FIFO buffer which is used in offset process means in the embodiment.

A detailed construction in the offset process means 37 will specifically be explained with reference to FIG. 12. FIG. 12 is a diagram for explaining a detailed construction of an FIFO buffer which is used in the offset process means 37 in the embodiment.

An FIFO buffer 9001 in FIG. 12 is an FIFO buffer which can store information about the Bk raster as much as 96 images. An output of one raster can be obtained for an input of one raster. Similarly, an FIFO buffer 9002 is an FIFO buffer which can store information about the M raster as much as 64 images. Similarly, an FIFO buffer 9003 is an FIFO buffer which can store information about the C raster as much as 32 images.

The above three FIFO buffers 9001 to 9003 are buffers in which data can be managed on a raster unit basis in accordance with a first-in/first-out procedure. Specifically speaking, the FIFO buffers 9001 to 9003 have: head addresses of areas where the data have actually been stored; sets of data lengths as many as a depth of each buffer; and counters for buffer management (inter-page raster number counters corresponding to a plurality of colors) CBk(n), CM(n'), and CC(n'').

When the data is inputted or outputted to/from the FIFO buffer, for example, when considering the Bk raster, a location of data (not shown) to be registered in the buffer is written into a field of the CBk(n)-th address/length. After that, the data shown by the address/length described in CBk(n+1) is taken out and a count value of the counter is incremented.

When the value of the counter corresponding to each color exceeds a buffer capacity (depth) (for example, 95 in case of Bk), the value of the counter is reset to "0". The data in those buffers has been cleared before the data is handled. Even at a transmission time point of the new page command due to the end of the transmission of the data of one page, the next data is also handled and the data in the buffers is also cleared at this timing.

The rasters of Bk, M, and C handed from the half toning means 34 is accumulated at the end of each FIFO buffer and both of the raster existing at the head of each FIFO buffer and the Y raster handed from the half toning means 34 are extracted as a set. By such an FIFO buffer managing mechanism, raster data according to a physical structure of the print head can be formed.

Figure 13:
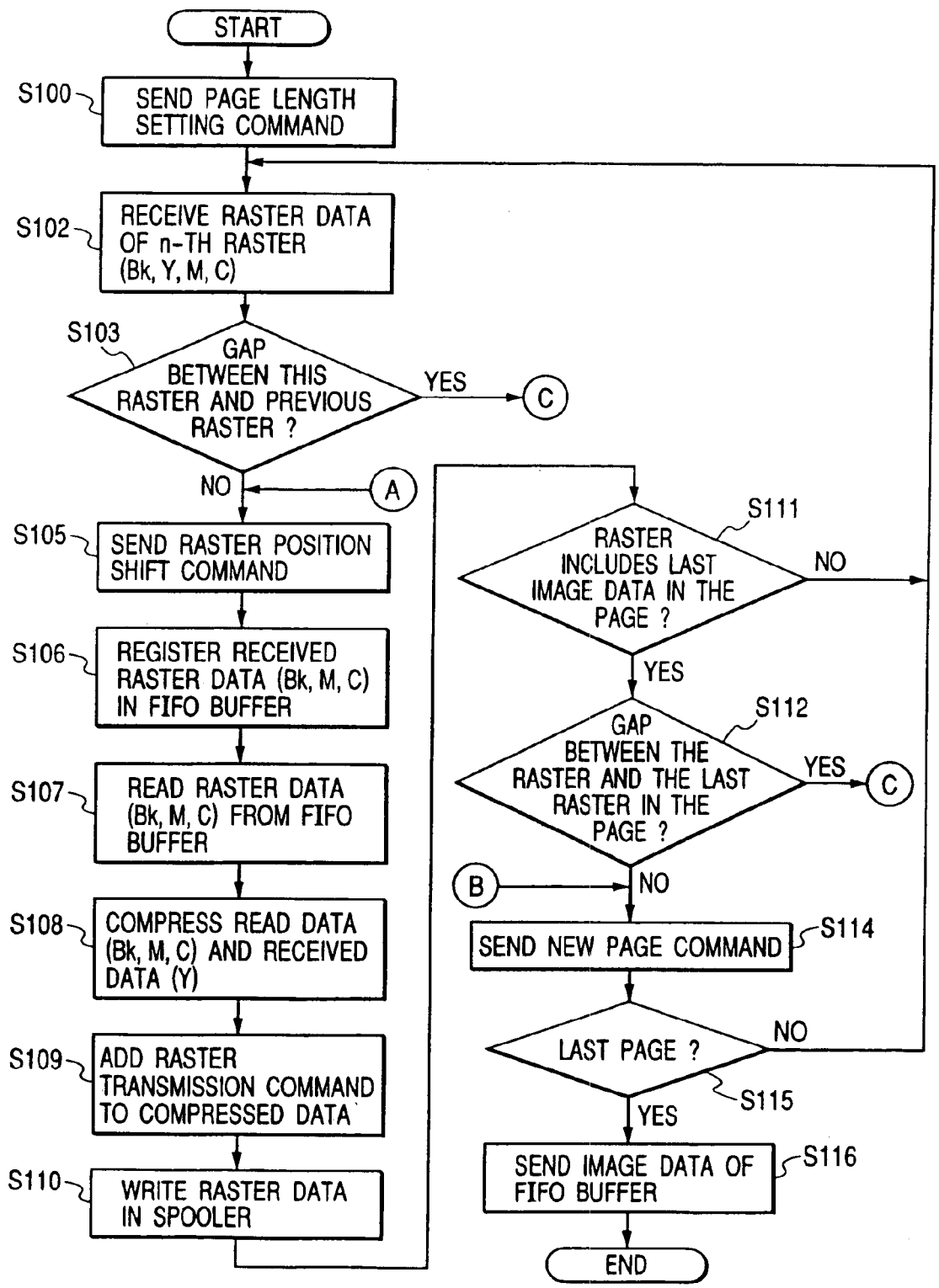
FIG. 13 is a flowchart showing a whole control of a printer driver shown in FIG. 11 in the embodiment.
Figure 14:
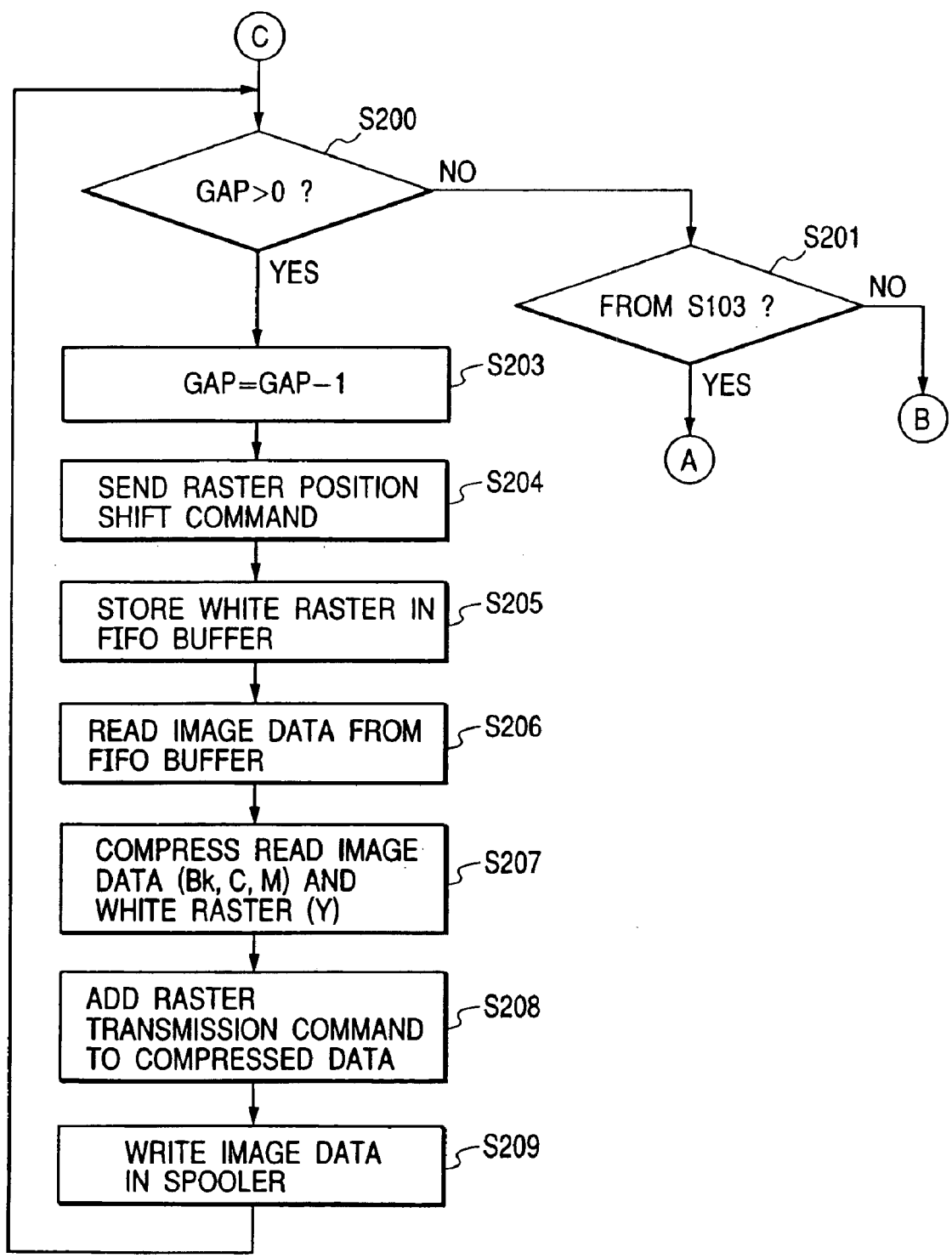
FIG. 14 is a flowchart showing a gap process in the printer driver in the embodiment.

A whole control in the printer driver in the embodiment will now be described with reference to flowcharts of FIGS. 13 and 14. FIG. 13 is the flowchart showing the whole control of the printer driver shown in FIG. 11 in the embodiment. FIG. 14 is the flowchart showing a gap process in the printer driver of the embodiment.

In the printer driver of the embodiment, although various kinds of commands exist as commands to be sent to the image output apparatus 52, an explanation will now be made with respect to an example in which four commands such as "page length setting command", "raster position shift command", "raster transmission command", and "new page command" have been sent.

First, in step S100, the page length setting command is sent. In step S102, the binarized raster data (Bk, Y, M, C) of the n-th raster is received as necessity from the half toning means 34.

Subsequently in step S103, a check is made to see if a gap exists between this raster and the previous raster. When the gap exists, the processing routine advances to step S200 in FIG. 14. That is, with respect to the first raster received in the page, a gap between this raster and the first raster at the head of the page is calculated. The gap process in FIG. 14 will be explained hereinlater.

In step S103, when no gap exists between this raster and the previous raster, step S105 follows and the raster position shift command of a skip amount "1" is sent. In step S106, the data with respect to each raster of Bk, M, and C received is registered into the FIFO management buffer for storage of the raster data shown in FIG. 12.

In step S107, each of the stored rasters of Bk, M, and C is extracted from the head of the FIFO management buffer. In step S108, the data of each of the extracted rasters of Bk, M, and C and the received raster of Y is compressed.

In step S109, the command header of the raster transmission command is added to the compressed raster data so that it can be transmitted to the printer. In step S110, each color raster data to which the command header was added is handed to a printer spooler B2, thereby sending it to the OS.

In step S111, a check is made to see if the present raster is the last raster including the image data in the page. If it is not the raster including the last image data in the page, the processing routine is returned to step S102.

In step S111, when it is the raster including the last image data in the page, step S112 follows and a check is made to see if there is a gap between the raster determined to be the raster including the last image data in the page and the last raster in the page set by the page length setting command. When there is the gap, the processing routine advances to a gap process in step S200 in FIG. 14, which will be explained hereinlater.

In step S112, when there is no gap between such a raster and the last raster in the page set by the page length setting command, step S114 follows and the new page command is issued. In step S115, a check is made to see if the current page is the last page. When it is not the last page, the processing routine is returned to step S102 and the processes for the next page are subsequently continued.

When it is determined in step S115 that the present page is the last page, all of the image data stored in the FIFO management buffer is sent to the image output apparatus 52 and the processing routine is finished.

Processes regarding the gap process in the printer driver process will now be described with reference to the flowchart of FIG. 14. The processes in FIG. 14 are executed in the case where it is determined in step S103 that there is the gap between this raster and the previous raster and in the case where it is decided in step S112 that there is the gap between the raster determined to be the raster including the last image data in the page and the last raster in the page set by the page length setting command.

First, in step S200, a check is made to see if the gap amount is larger than 0. When the gap amount is equal to 0, step S201 follows and a check is made to see if the processing routine has advanced from the process in step S103 in FIG. 13 to the relevant process. If YES, step S105 follows.

If it is determined in step S201 that the processing routine does not advance from the process in step S103 to the relevant process but advanced from the process in step S112 to the relevant process, step S114 follows.

When the gap amount is larger than 0 in the discrimination in step S200, step S203 follows and a calculation to subtract "1" from the gap amount is performed. In step S204, the raster position shift command of the skip amount 1 is sent to the image output apparatus 52 through the printer spooler 22.

In step S205, rasters constructed in white for each color (which does not include image data) are stored at the end of the FIFO management buffer. In step S206, the image data is extracted from the head of the FIFO management buffer.

In step S207, with respect to Bk, C, and M, the image data taken out via the FIFO management buffer is compressed. With regard to Y, the white raster (blank) which does not include any image data is compressed.

In step S208, the command header is added to the formed compression data so that it can be transmitted to the printer. In step S209, the compressed image data to which the command header was added is handed to the printer spooler 22 so as to send the image data to the printer. The processing routine is returned to the process in step S201.

Figure 15:
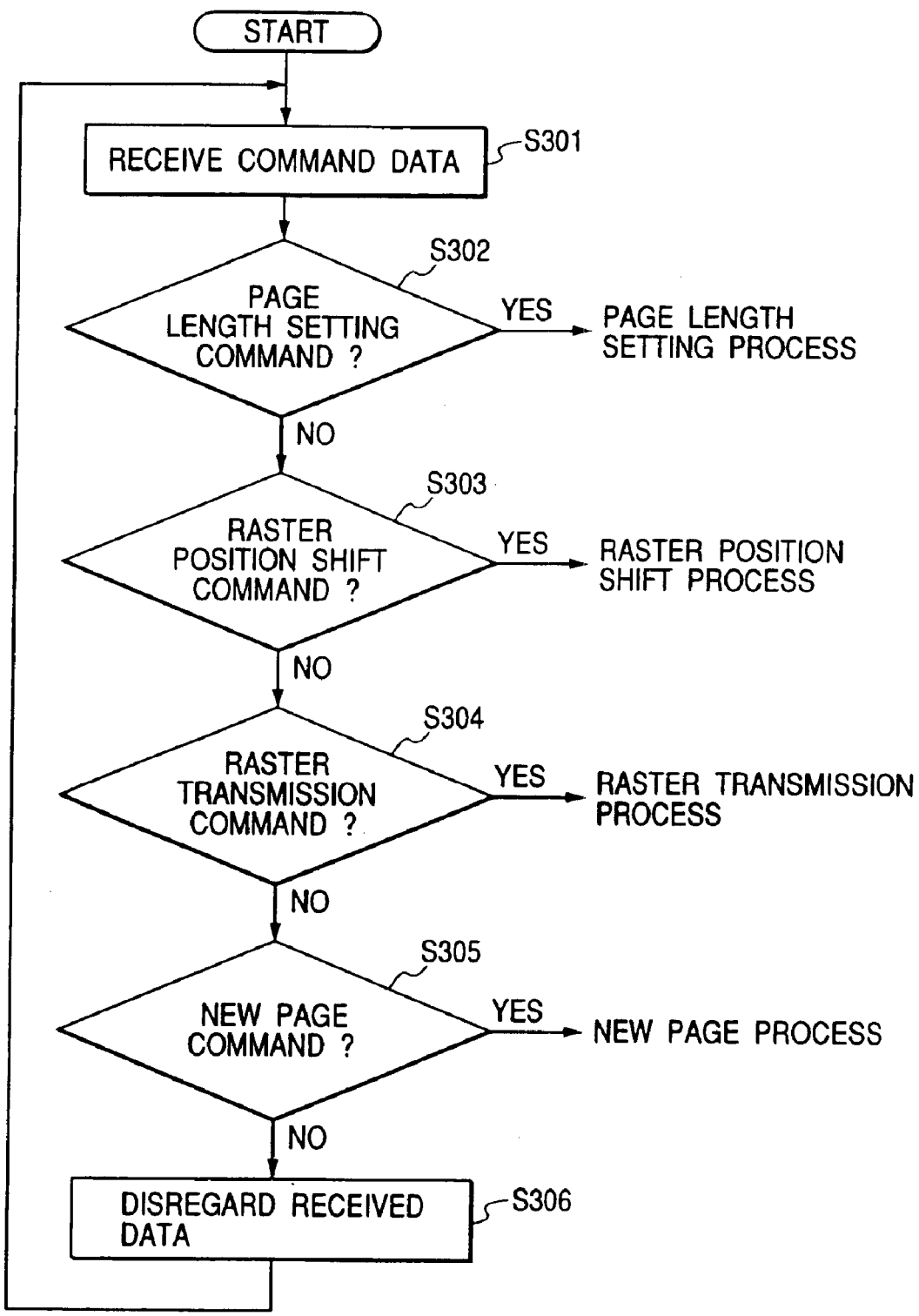
FIG. 15 is a flowchart for explaining a command process of an image output apparatus in the embodiment.
Figure 16:
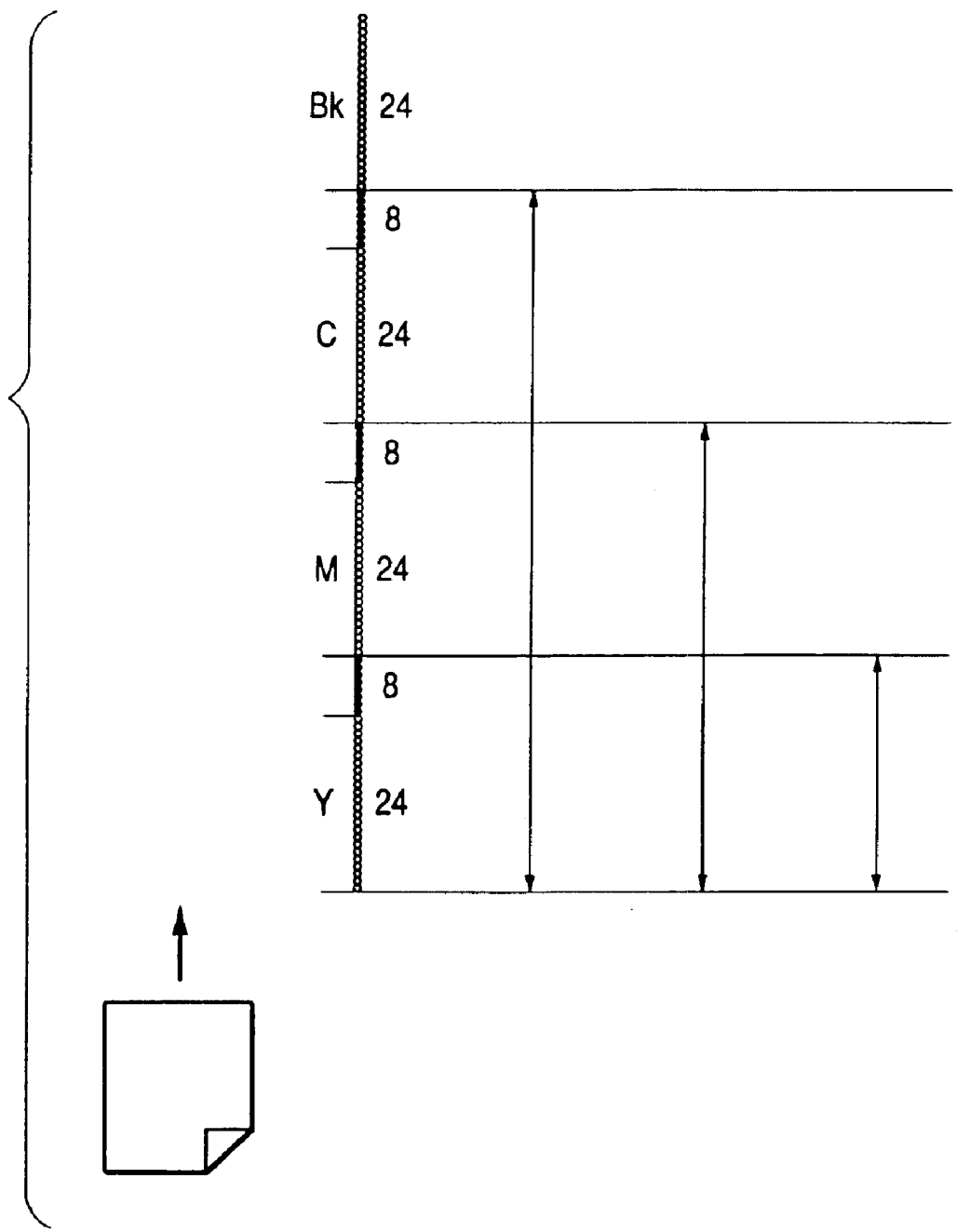
FIG. 16 is a diagram showing an example of a structure of a general recording head.
Figure 17:
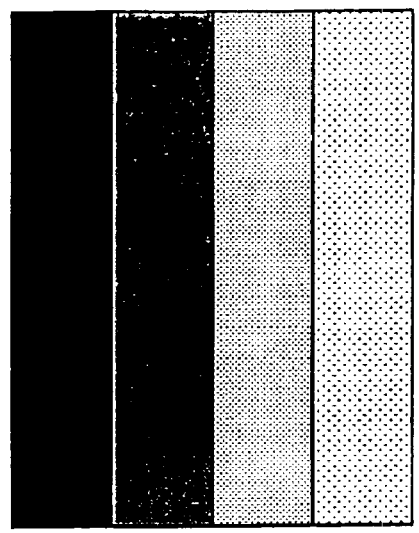
FIG. 17 is a diagram showing an example of arrangement of colors on a recording paper.
Figure 18:
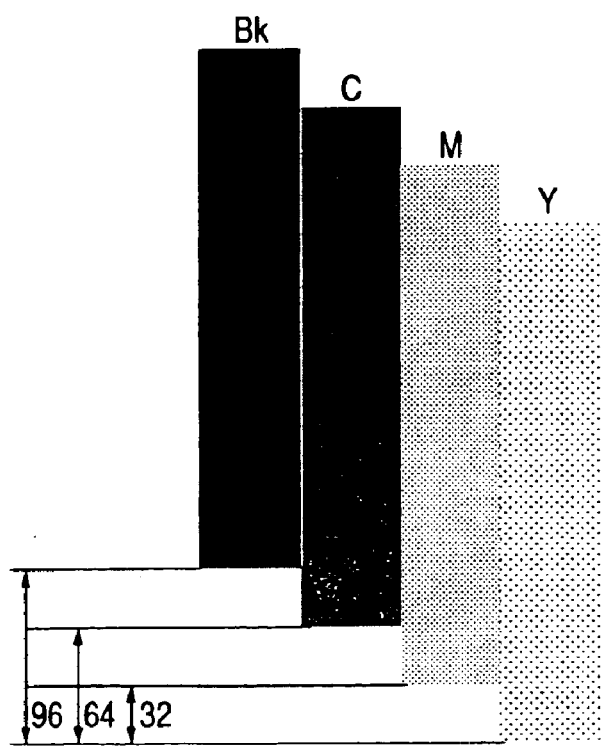
FIG. 18 is a diagram showing an example in the case where data in FIG. 17 is offset transmitted and is a diagram showing an example of arrangement of colors on a recording paper.
Figure 19:
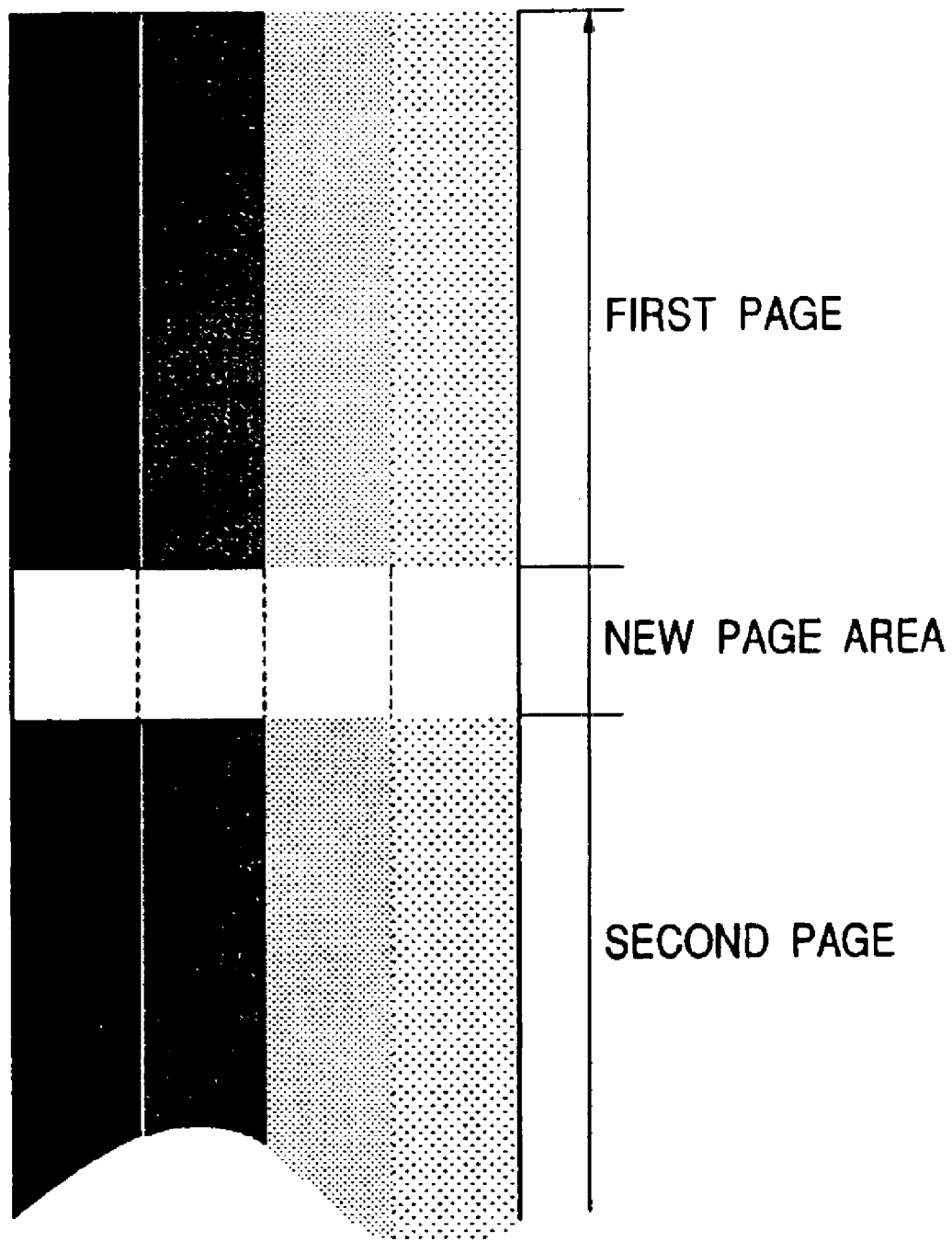
FIG. 19 is a diagram showing an example of image information of an image in which a plurality of pages are continuous in the subscanning direction.
Figure 20:
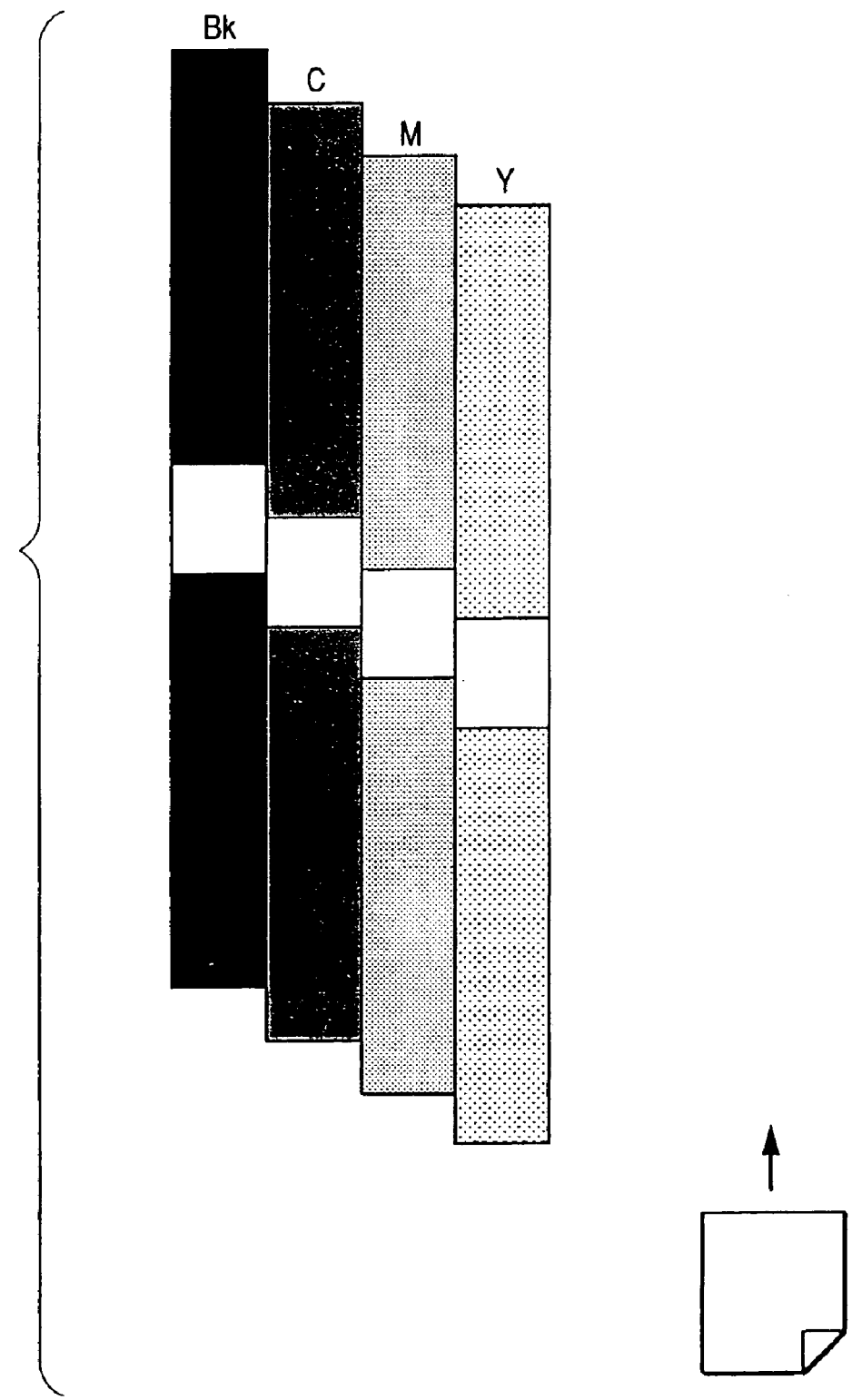
FIG. 20 is a diagram showing an example of an offset transmission of a longitudinal paper including a new page area.

A control of the image output apparatus 52 for receiving the print data and print control information which are transmitted through the communication interface 1008 in accordance with the processes described above will now be explained hereinbelow with reference to a flowchart of FIG. 15. FIG. 15 is the flowchart for explaining command processes of the image output apparatus 52 in the embodiment.

In FIG. 15, first in step S301, command data is received from the printer spooler 22 of the host apparatus main unit 1000. Subsequently, in a command kind discriminating process to discriminate whether the received data train is which command is performed in the processes in step S302 and subsequent steps. Subsequently, control contents with respect to each command will be briefly explained.

First in step S302, a check is made to see if the received command is the page length setting command. If the received command is the page length setting command, the page length setting process is performed and the page length is set to a value designated by the command only in the case where a count value of the raster position counter in the page with respect to the current reference color (it is now assumed to be Y in the embodiment) is equal to 0 and where the print data is not yet received. When the above conditions are not satisfied, the command is ignored.

When it is determined in step S302 that the received command is not the page length setting command, step S303 follows and a check is made to see if the received command is the raster position shift command. If YES, the raster position shift process is executed.

In the embodiment, although the print raster data is sent one raster by one, as for the printing operation itself, since the recording head has a plurality of nozzles every color, a counter showing by which number of nozzles from the head nozzle the received raster data is printed in the next printing operation is provided. Only when all of the raster data corresponding to the number of nozzles actually equipped is obtained, the printing can be started.

It is now assumed that the current raster position corresponds to the position of the n-th nozzle.

When (n+raster position shift amount≦the total number of nozzles of each color),
the count value of a nozzle position designation counter is updated to (n+raster position shift amount).

When (n+raster position shift amount>the total number of nozzles of each color),
after the image data of the print buffer was printed, the print paper is moved in the subscanning direction by only a distance of
(raster position shift amount+value of the nozzle position designation counter−1).

After that, the raster position shift amount is added to a count value of a raster position counter in the page prepared for each color and the process is performed.

When the received command is not the raster position shift command in step S303, step S304 follows and a check is made to see if the command is a raster transmission command. If YES, a raster transmission process is performed.

First, the received raster data of each color of Bk Y, M, and C is developed in the area in the print buffer which is shown by the nozzle position designation counter and which should transmit the current raster image. When the count value of the raster position counter in the page mentioned above exceeds the value set by the page length setting command, the raster data is not developed to the print buffer but is ignored.

In step S304, when the received command is not the raster transmission command, step S305 follows and whether the received command is the new page command or not is discriminated. If YES, the next page process is performed.

The raster position counter in the page is initialized to a value of (0) with respect to Y of the reference color, a value of (−32) with respect to M, a value of (−64) with respect to C, and a value of (−96) with respect to Bk. By this operation, for example, a contradiction such that while performing the process on the first raster of a second page for the reference color (Y), the last data of the previous page is processed for the other colors of M, C, and Bk is solved.

In step S306, when the received command is not the new page command, since it is not the command which can be processed by the image output apparatus 52 of the embodiment, the received data is disregarded. The processing routine is again returned to step S301, thereby preparing for reception of the next data.

According to the embodiments as described above, by using the printer driver software installed in the host apparatus such as a personal computer or a word processor, just before the new page command is generated with respect to the reference color, the raster (subscanning direction) position shift command for the last raster among the inter-page rasters of the number which has been set at present is internally generated by the driver software and, after that, the new page command is sent to the recording apparatus. In the recording apparatus, at a time point when the new page command is received, the counter to manage the current raster position in the page can be initialized in accordance with the offset value which has been predetermined every color. While reducing the memory use amount in the image output apparatus 52 by performing the offset transmission, the image data can be printed to a longitudinal print paper by virtually regarding that short papers are continuously coupled without any gap.

The offset process module 37 and data compression/command addition module 38 described above can be set to the module 35-3 including the foregoing offset transmission program.

According to the embodiments as described above, while reducing the memory use amount in the image output apparatus by performing the offset transmission, the image data can be printed to a longitudinal print medium by virtually regarding that short papers are continuously coupled without any gap. Further, in case of using a construction such that the processing module can be exchanged by the image output apparatus, the system which can print the image data onto the longitudinal recording medium and performs the offset transmission and the system which does not perform the offset transmission can be flexibly switched.

Module Having Logical Means for Deciding an Emission Pattern for Waterproof Reinforcement Agent Subsequently, the module 35-2 having logical means for deciding an emission pattern of the waterproof reinforcement agent mentioned above will be described. First, the driver software installed in the host apparatus has a structure as shown in C in FIG. 1. In the diagram, A denotes the layer of the application software (hereinafter, abbreviated to as "App."); B the layer constructing the operating system (hereinafter, abbreviated to as "OS"); and C the layer of the driver software. When the App. A1 outputs an image to the image output apparatus, the App. issues drawing commands of characters, line segments, a figure, a bit map, etc. via the drawing process interface B1 of the OS. When the drawing commands constructing the screen/paper surface are completed, the OS converts each drawing command from an internal format of the OS into a representation format (in which each drawing unit is line divided) that is peculiar to the apparatus while accessing the inherent drawing means in the drivers 31-1 to 31-n. In this case, the image data is handed to the color characteristic conversion means 33 as dot-sequential raster data in which each color of RGB is expressed by 8 bits/pixel. The color characteristic conversion means 33 corrects the color characteristics of the device and converts them from the colorimetric system in the driver into the calorimetric system peculiar to the device. In this case, they are handed to the half toning means 34 as dot-sequential raster data in which each color of KCMY is expressed by 8 bits/pixel. The half toning means 34 performs a conversion to a quantum value indicative of a state of each pixel of the device and hands the quantum value as line-sequential data of 1 to 4 bits/pixel for each color to the waterproof reinforcement agent data forming means 35-2 which has the common interface 36-1 and is the independent program module which can be switched. In the waterproof reinforcement agent data forming means 35-2, the line-sequential data of 1 to 4 bits/pixel of the waterproof reinforcement agent color (P) is formed by a waterproof reinforcement agent data forming method, which will be explained hereinlater, while referring to the line-sequential data of each color of KCMY. Further, the waterproof reinforcement agent data of each color of KCMY is handed as line-sequential data of 1 to 4 bits/pixel to the data compression/command addition means. The data compression/command addition means performs a compression by the PackBits format on the basis of the handed image data in order to improve the image transmission efficiency, adds the print command header to the image data, and hands the resultant data to the printer spooler 22 of the system via a data output interface 36-2. The printer spooler of the system transmits the image data to the printing apparatus in accordance with the procedure which has been predetermined in the IEEE1284. The waterproof reinforcement agent data forming means 35-2 receives, for example, a similar line-sequential halftone image, performs only the compression/command addition (does not form the waterproof reinforcement agent data), and can properly switch to the program module 35-1 of the same interface specifications in accordance with the kind of printer and the print mode and can use it.

Figure 21:
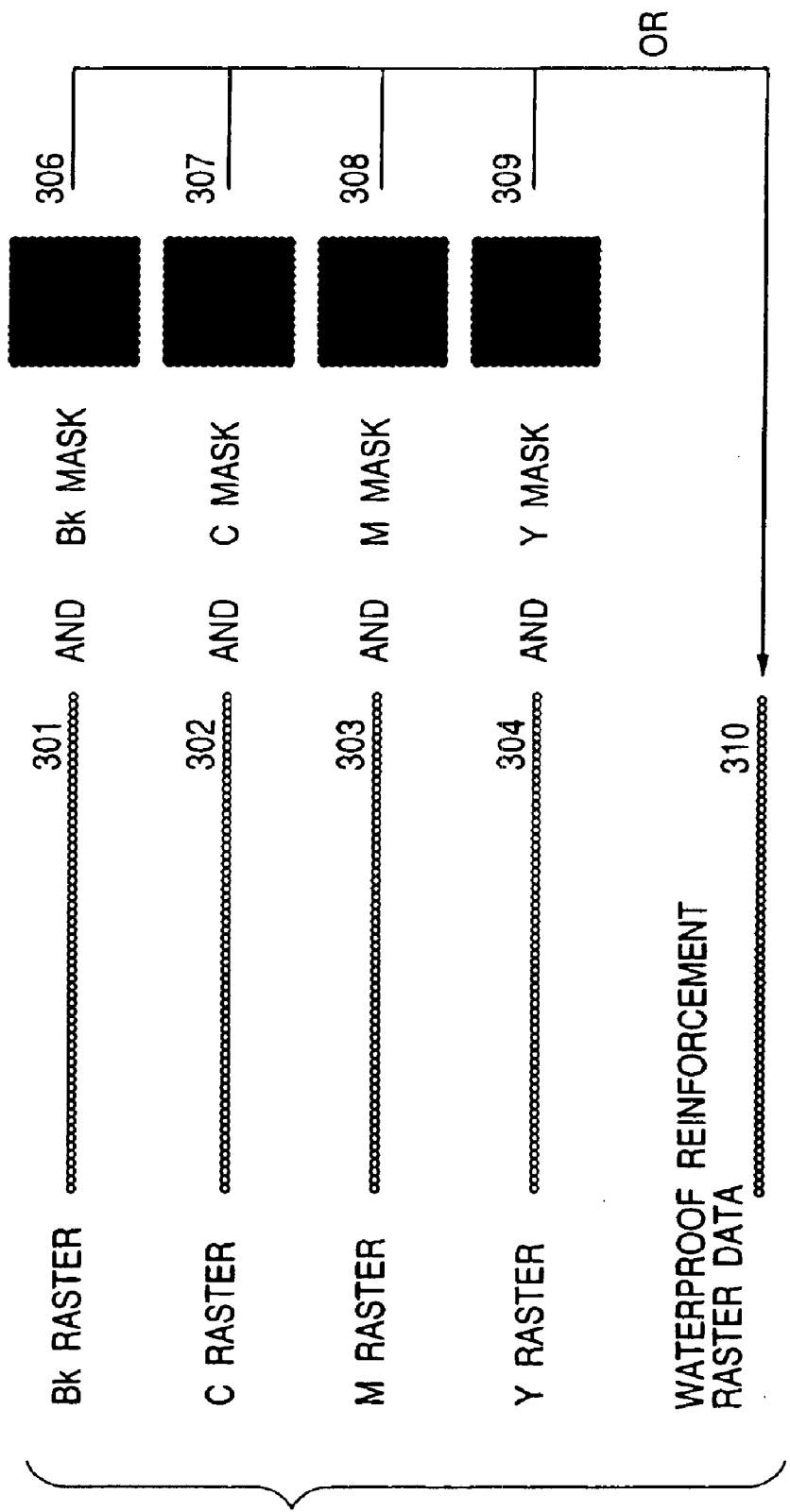
FIG. 21 is a diagram for explaining a method of forming waterproof reinforcement data.
Figure 22:
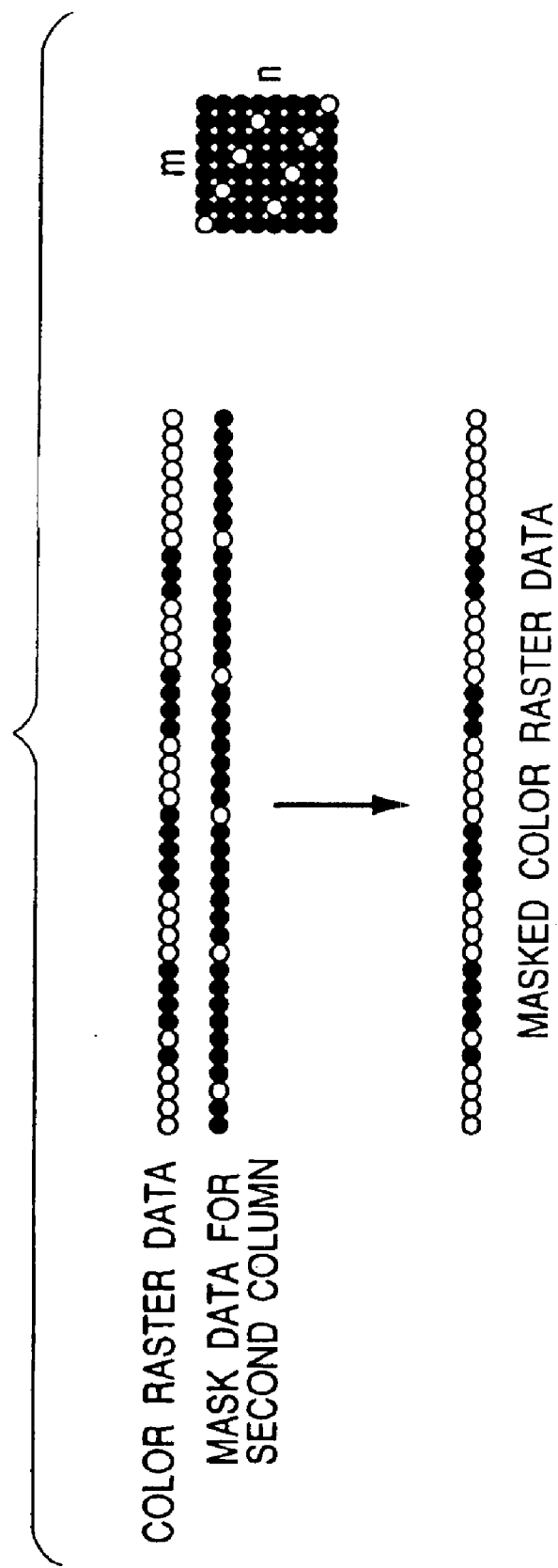
FIG. 22 is a diagram for explaining a mask data applying method.

The waterproof reinforcement agent data forming method in the embodiment will now be described with reference to FIG. 21. FIG. 21 is a schematic explanatory diagram of the method of forming the waterproof reinforcement data in the embodiment. In the diagram, reference numeral 301 denotes a black line-sequential raster data of 1 to 4 bits/pixel handed from the half toning means. Similarly, reference numerals 302, 303, and 304 denote line-sequential raster data of cyan, magenta, and yellow, respectively. Reference numerals 305, 306, 307, and 308 denote mask data each having a size of (m bits×n bits) shown in FIG. 22. Now, assuming that the number of rasters when they are counted from the head of the page is equal to X (namely, the X-th raster), by calculating the AND of the data in which the mask data train of the number-th raster corresponding to the remainder obtained by dividing X by n is repeated and the line-sequential raster, each of the masked color data can be obtained. The mask data can be used by properly deciding a size, a duty, and a pattern in order to keep a proper ratio between each color ink and the waterproof reinforcement agent for the purpose of obtaining waterproof performance and the waterproof reinforcement agent or in order to prevent the ink or waterproof reinforcement agent from injecting by an amount over a water absorbing capacity of the paper surface. Subsequently, by calculating the OR of the respective masked color data obtained by the similar means, raster data of the waterproof reinforcement agent can be obtained. For example, if a pattern of duty ratio of 100% is used as each color mask pattern, the waterproof reinforcement agent can be injected to all of the existing dot positions.

According to the embodiments as described above, the waterproof reinforcement agent data can be formed while relatively preventing the deterioration of the performance and the increase in costs of the system. The construction using the modules which can be switched is effective when the above functions are installed.

As described above, by controlling the offset transmission and generating the pattern of the waterproof reinforcement agent by the printer driver, the performance can be relatively effected while suppressing an increase in costs of the hardware (ROM, RAM, gate array) of the printer.

By using the modules which can be switched, the following advantages are obtained.

(Merit of the Developer)

When the processes which have conventionally been performed in the printer are handed to the driver, since they are divided by the interface which can be easily understood, even a developer who does not have enough knowledge about the driver can easily develop. Therefore, the developer of the printer main unit can easily implement the codes into the driver.

Since the apparatus has the structure such that the common interface is shared and which can be switched, the function of this portion can be added without being aware of the driver software main unit.

(Merit of the User)

As compared with the case where all of the portions of the overlapped functions are statically linked to the printer driver main unit, only the necessary ones of the overlapped function portions are loaded and installed, so that the loading time and memory can be saved.

In the case where the modules which can be switched are cut out on a unit basis of the kind of printer, as compared with the case where all of those portions are statically linked to the printer driver main unit, a disk capacity which is used upon installation is saved.

To make it unnecessary to again prepare an installing disk when the user adds another equipment later, all of the modules which are not used at present can be also installed.

In the embodiment, it is also possible to construct such that the printer A is a printer which needs the waterproof reinforcement agent data, the printer B is a printer which needs the offset transmission, the head A of the printer C is a head which needs the waterproof reinforcement agent data, and the head B of the printer C is a head which needs the offset transmission.

According to the invention as described above, a hardware scale of the memory or the like of the printer is reduced as small as possible and a cheap printer can be provided.

The printer driver programs can be easily developed.

What is claimed is:

1. An information processing apparatus comprising:
    a common processing module for providing a common image processing that quantizes image information for a printer connected to said information processing apparatus irrespective of the type of the connected printer;
    a plurality of individual processing modules each providing a different image processing that modifies the image information quantized by said common processing module for a printer connected to said information processing apparatus depending on the type of the connected printer; and
    means for switching among said plurality of individual processing modules in accordance with the type of the connected printer and outputting information processed by the switched module to the connected printer.

2. An apparatus according to claim 1, wherein said modules are modules to form emission data for a waterproof reinforcement agent.

3. An apparatus according to claim 1, wherein said modules are modules for offset transmitting the information in accordance with a head of the output apparatus.

4. An apparatus according to claim 1, wherein the switching among said modules is executed when a driver program is installed.

5. An apparatus according to claim 1, wherein the switching among said modules is executed when an image is outputted to the output apparatus.

6. An apparatus according to claim 1, wherein said individual processing modules are for use in forming predetermined information, and wherein the predetermined image information is quantized information.

7. An apparatus according to claim 6, wherein the quantized information includes binarized information.

8. An information processing system comprising an information processing apparatus according to claim 1 and the connected printer.

9. An information processing apparatus comprising:
    a common processing module for providing a common image processing that quantizes image information for a printer connected to said information processing apparatus irrespective of the type of the connected printer;
    a plurality of individual processing modules each providing a different image processing that modifies the image information quantized by said common processing module for a printer connected to said information processing apparatus depending on the type of the connected printer; and
    means for switching among said plurality of individual processing modules in accordance with information indicating the type of the connected printer obtained from the printer and outputting information processed by the switched module to the connected printer.

10. A data processing method of using a common processing module for providing a common image processing that quantizes image information for a connected printer irrespective of the type of the connected printer, and a plurality of individual processing modules each for providing a different image processing that modifies the image information quantized by said common processing module for a connected printer, comprising the steps of:
    switching among the plurality of individual processing modules in accordance with the type of the connected printer; and
    outputting information processed by the switched module to the connected printer.

11. A method according to claim 10, wherein the modules are modules to form emission data for a waterproof reinforcement agent.

12. A method according to claim 10, wherein the modules are modules for offset transmitting the information in accordance with a head of the output apparatus.

13. A method according to claim 10, wherein the switching among the modules is executed when a driver program is installed.

14. A method according to claim 10, wherein the switching among the modules is executed when an image is outputted to the output apparatus.

15. A method according to claim 10, wherein the individual processing modules are for use in forming predetermined information, and wherein the predetermined image information is quantized information.

16. A method according to claim 15, wherein the quantized information includes binarized information.

17. A method according to claim 10, wherein the connected printer is an ink jet printer.

18. A data processing method of a common processing module for providing a common image processing that quantizes image information for a connected printer irrespective of the type of the connected printer and a plurality of individual processing modules for each providing a different image processing that modifies the image information quantized by said common processing module for a connected printer depending on the type of the connected printer, comprising the steps of:
    switching among the plurality of individual processing modules in accordance with information indicating the type of the connected printer obtained from the connected printer; and
    outputting information processed by the switched module to the connected printer.

19. A computer readable memory medium in which is stored in executable form a program using a common processing module for providing a common image processing that quantizes image information for a connected printer irrespective of the type of the connected printer, and a plurality of individual processing modules each for providing a different image processing that modifies the image information quantized by said common processing module for a connected printer, wherein said program comprises the steps of:
    switching among the plurality of individual processing modules in accordance with information indicating the type of the connected printer obtained from the connected printer; and
    outputting information processed: by the switched module to the connected printer.

20. A medium according to claim 19, wherein the processing modules form emission data for a waterproof reinforcement agent.

21. A medium according to claim 19, wherein the processing modules offset transmitting the information in accordance with a head of the output apparatus.

22. A medium according to claim 19, wherein the switching among the processing modules is executed when a driver program is installed.

23. A medium according to claim 19, wherein the switching among the processing modules is executed when an image is outputted to the connected printer.

24. A medium according to claim 19, wherein the individual processing modules are for use in forming predetermined information, and wherein the predetermined image information is quantized information.

25. A medium according to claim 24, wherein the quantized information includes binarized information.

26. A computer readable memory medium in which is stored in executable form a program using a common processing module for providing a common image processing that quantizes image information for a connected printer irrespective of the type of the connected printer and a plurality of individual processing modules for each providing a different image processing that modifies the image information quantized by said common processing module for a connected printer depending on the type of the connected printer, wherein said program comprises the steps of:

switching among the plurality of individual processing modules in accordance with information indicating the type of the connected printer obtained from the connected printer; and outputting information processed by the switched module to the connected printer.

27. An information processing apparatus comprising:

memory means storing a common processing module for providing a common image processing that quantizes image information for a connected printer irrespective of the type of the connected printer and a plurality of individual processing modules each for providing a different image processing that modifies the image information quantized by said common processing module for a connected printer depending on the type of the connected printer; and executing means for executing the processing program stored in said memory means.

28. An apparatus according to claim 27, wherein the individual processing modules each include a module for forming pattern data for a waterproof reinforcement agent on the basis of the image data formed by the common printer module and transmitting the formed pattern data for the waterproof reinforcement agent and the image data to the printer.

29. An apparatus according to claim 27, wherein the individual processing modules each include for offset transmitting the image data formed by the common processing module in accordance with a head in which recording elements as equal in number to a plurality of colors used in recording are arranged in a paper feeding direction of the connected printer.

30. An apparatus according to claim 29, wherein the individual processing modules each include a control module for controlling the offset transmission when data for a longitudinal paper is printed by the connected printer.

31. An apparatus according to claim 30, wherein the control module includes a module for setting a raster position of a reference color to "0" at a timing of a new page of the reference color and setting raster positions of the other colors to minus values.

32. An apparatus according to claim 27, wherein said processes include a working process or a transmitting process.

33. An apparatus according to claim 27, further comprising printing means for printing on the basis of the print data which is outputted from said processing modules.

34. An apparatus according to claim 33, wherein said printing means includes an ink jet printer.

35. A method of forming a processing program, comprising the steps of:

forming a common processing module for providing a common image processing that quantizes image information for a connected printer irrespective of the type of the connected printer; and forming a plurality of individual processing modules each for providing a different image processing that modifies the image information quantized by said common processing module for a connected printer depending on the type of the connected printer.

36. A method according to claim 35, wherein the individual processing modules each include modules for forming pattern data for a waterproof reinforcement agent on the basis of the image data formed by the common processing module and transmitting the formed pattern data for the waterproof reinforcement agent and the image data to the connected printer.

37. A method according to claim 35, wherein the individual processing modules each include a module for offset transmitting the image data formed by the common processing module in accordance with a head in which recording elements equal in number to a plurality of colors used in recording are arranged in a paper feeding direction of the connected printer.

38. A method according to claim 37, wherein the individual processing modules each include a control module for controlling the offset transmission when data for a longitudinal paper is printed by the connected printer.

39. A method according to claim 38, wherein the control module includes a module for setting a raster position of a reference color to "0" at a timing of a new page of the reference color and setting raster positions of the other colors to minus values.

40. A method according to claim 35, wherein said processes include a working process or a transmitting process.

41. A memory medium in which a processing program which is executed by a computer is stored, wherein said program comprises:

a common processing module for providing a common image processing that quantizes image information for a connected printer irrespective of the type of the connected printer; and a plurality of individual processing modules each for providing a different image processing that modifies the image information quantized by said common processing module for a connected printer depending on the type of the connected printer.

42. A medium according to claim 41, wherein said individual processing modules each include a module for forming pattern data for a waterproof reinforcement agent on the basis of the image data formed by said common processing module and transmitting said formed pattern data for the waterproof reinforcement agent and the image data to the printer.

43. A medium according to claim 41, wherein said individual processing modules each include a module for offset transmitting the image data formed by said first module in accordance with a head in which recording elements equal in number to a plurality of colors used in recording are arranged in a paper feeding direction of the printer.

44. A medium according to claim 43, wherein said individual processing modules each include a control module for controlling the offset transmission when data for a longitudinal paper is printed by the printer.

45. A medium according to claim 44, wherein said control module includes a module for setting a raster position of a reference color to "0" at a timing of a new page of the reference color and setting raster positions of the other colors to minus values.

46. A method according to claim 41, wherein said processes include a working process or a transmitting process.

47. A program product, including a computer-executable program using a common processing module for providing a common image processing that quantizes image information for a connected printer irrespective of the type of the connected printer, and a plurality of individual processing modules each for providing a different image processing that modifies the image information quantized by said common processing module for a connected printer, wherein said program comprises the steps of:

switching among the plurality of individual processing modules in accordance with information indicating the type of the connected printer obtained from the connected printer; and outputting information processed by the switched module to the connected printer.

48. A program product including a computer-executable program using a common processing module for providing a common image processing that quantizes image information for a connected printer irrespective of the type of the connected printer and a plurality of individual processing modules for each providing a different image processing for a connected printer depending on the type of the connected printer, wherein said program comprises the steps of:

switching among the plurality of individual processing modules in accordance with information indicating the type of the connected printer obtained from the connected printer; and outputting information processed by the switched module to the connected printer.

49. A program product including a computer-executable processing program which is executed by a computer, wherein said program comprises:

a common processing module for providing a common image processing that quantizes image information for a connected printer irrespective of the type of the connected printer; and a plurality of individual processing modules each for providing a different image processing that modifies the image information quantized by said common processing module for a connected printer depending on the type of the connected printer.

* * * * *